(12) United States Patent
Feldmann

(10) Patent No.: US 7,176,656 B2
(45) Date of Patent: Feb. 13, 2007

(54) TOOL WITH BATTERY PACK

(75) Inventor: William Mark Feldmann, Fairfield, OH (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 60 days.

(21) Appl. No.: 10/873,050

(22) Filed: Jun. 22, 2004

(65) Prior Publication Data
US 2005/0280393 A1    Dec. 22, 2005

(51) Int. Cl.
*H02J 7/00*      (2006.01)
(52) U.S. Cl. .................... 320/114; 320/112
(58) Field of Classification Search ............. 320/111, 320/114, 116, 117, 136, 120–121; 429/99
See application file for complete search history.

(56) References Cited

U.S. PATENT DOCUMENTS

| | | | | |
|---|---|---|---|---|
| 3,694,729 | A | | 9/1972 | Jones .......................... 307/150 |
| 4,081,738 | A | * | 3/1978 | Roller ......................... 320/117 |
| 4,851,756 | A | | 7/1989 | Schaller et al. ............... 307/46 |
| 5,086,235 | A | | 2/1992 | Marquet et al. .............. 307/85 |
| 5,121,046 | A | * | 6/1992 | McCullough ................ 320/117 |
| 5,175,531 | A | | 12/1992 | Whitmire et al. ............ 320/126 |
| 5,418,433 | A | | 5/1995 | Nilssen ........................ 315/176 |
| 5,477,124 | A | * | 12/1995 | Tamai .......................... 320/135 |
| 5,537,390 | A | | 7/1996 | Horiba et al. ................ 320/134 |
| 5,545,935 | A | | 8/1996 | Stewart ....................... 307/105 |
| 5,712,553 | A | * | 1/1998 | Hallberg ...................... 307/75 |
| 5,793,187 | A | | 8/1998 | DeBauche .................... 320/125 |
| 5,973,476 | A | * | 10/1999 | Irvin ........................... 320/112 |
| 6,043,626 | A | * | 3/2000 | Snyder et al. ............... 320/113 |
| 6,049,141 | A | * | 4/2000 | Sieminski et al. ............ 307/44 |
| 6,084,382 | A | | 7/2000 | Hite ............................ 320/124 |
| 6,104,162 | A | * | 8/2000 | Sainsbury et al. ........... 320/111 |
| 6,191,554 | B1 | | 2/2001 | Nakane et al. ............... 320/107 |
| 6,229,280 | B1 | | 5/2001 | Sakoh et al. ................. 320/114 |
| 6,268,711 | B1 | * | 7/2001 | Bearfield ..................... 320/117 |
| 6,329,795 | B1 | * | 12/2001 | Nakashimo .................. 320/134 |
| 6,404,168 | B1 | | 6/2002 | Shoji ............................ 307/66 |
| 6,411,062 | B1 | * | 6/2002 | Baranowski et al. ......... 320/112 |
| 6,414,403 | B2 | | 7/2002 | Kitagawa et al. ............ 320/117 |
| 6,430,692 | B1 | * | 8/2002 | Kimble et al. ............... 713/300 |
| 6,522,902 | B2 | * | 2/2003 | Nishihara et al. ............ 455/574 |
| 6,528,969 | B2 | * | 3/2003 | Tung et al. .................. 320/103 |
| 6,577,104 | B2 | * | 6/2003 | Sakakibara .................. 320/132 |

(Continued)

FOREIGN PATENT DOCUMENTS

EP    0657982 B1    2/1998

*Primary Examiner*—Karl Easthom
*Assistant Examiner*—Samuel Berhanu
(74) *Attorney, Agent, or Firm*—Jones Day

(57) ABSTRACT

A handheld tool has an attached position in which the tool is removably attached to a battery pack. The battery pack has an auxiliary battery and output terminals for outputting electricity from the auxiliary battery. The tool includes a load and a primary battery. Input terminals of the tool are configured to connect to the battery output terminals when the tool is in the attached position. A circuit is connected to the load, the primary battery and the input terminals. The circuit is configured to power the load solely from the primary battery when the housing is not in the attached position, and to power the load from both the primary and auxiliary batteries in series when the housing is in the attached position.

20 Claims, 26 Drawing Sheets

U.S. PATENT DOCUMENTS

| | | | |
|---|---|---|---|
| 6,804,461 B1* | 10/2004 | Hagiuda et al. | 396/203 |
| 6,815,930 B2* | 11/2004 | Goodman | 320/134 |
| 2002/0102844 A1* | 8/2002 | Manning | 438/672 |
| 2002/0149502 A1* | 10/2002 | Goss | 340/870.07 |
| 2002/0175656 A1* | 11/2002 | Matsunaga et al. | 320/128 |
| 2003/0102844 A1* | 6/2003 | Bailey | 320/114 |
| 2004/0072064 A1 | 4/2004 | Turner et al. | 173/217 |

* cited by examiner

US 7,176,656 B2

TOOL WITH BATTERY PACK

TECHNICAL FIELD

This application relates to battery powered tools.

BACKGROUND

A handheld battery-powered drill is used to rotate a drill bit for drilling a hole in a material. The drill includes a chuck that grasps the drill bit and a motor that rotates the chuck. The motor is powered by a rechargeable battery pack that is removably attached to the drill. The battery pack can be recharged by disconnecting the battery pack from the drill and connecting it to a battery charger.

SUMMARY

A handheld tool has an attached position in which the tool is removably attached to a battery pack. The battery pack has an auxiliary battery and output terminals for outputting electricity from the auxiliary battery. The tool comprises a load and a primary battery. Input terminals of the tool are configured to connect to the battery output terminals when the tool is in the attached position. A circuit is connected to the load, the primary battery and the input terminals. The circuit is configured to power the load solely from the primary battery when the housing is not in the attached position, and to power the load from both the primary and auxiliary batteries in series when the housing is in the attached position.

Preferably, the tool is a drill, and the load is a motor. The circuit is configured to monitor the voltages of the primary and second batteries individually to determine which, if any, of the two batteries is weak. The circuit can connect the auxiliary battery user-selectably in series or in parallel with the primary battery and the load when the pack is attached to the tool.

An apparatus comprises a handheld tool housing structure that can be grasped by hand as a single unit. A load is housed in the housing structure. First and second batteries are also housed in the housing structure. A circuit is configured to conduct current through the load and the batteries in series and to monitor the voltage of each battery individually to determine which, if any, of the batteries is weak.

A battery pack comprises a battery. It further comprises two output terminals configured to be removably connected to two input terminals of a tool for powering the tool. A circuit monitors the voltage of the battery and also provides a conduction path across the output terminals. The conduction path is through the battery when the battery voltage is above a threshold level and is diverted around the battery when the battery voltage is below the threshold level.

DESCRIPTION

Apparatuses disclosed below have parts which are examples of the elements recited in the claims.

First Apparatus

Figure 1:
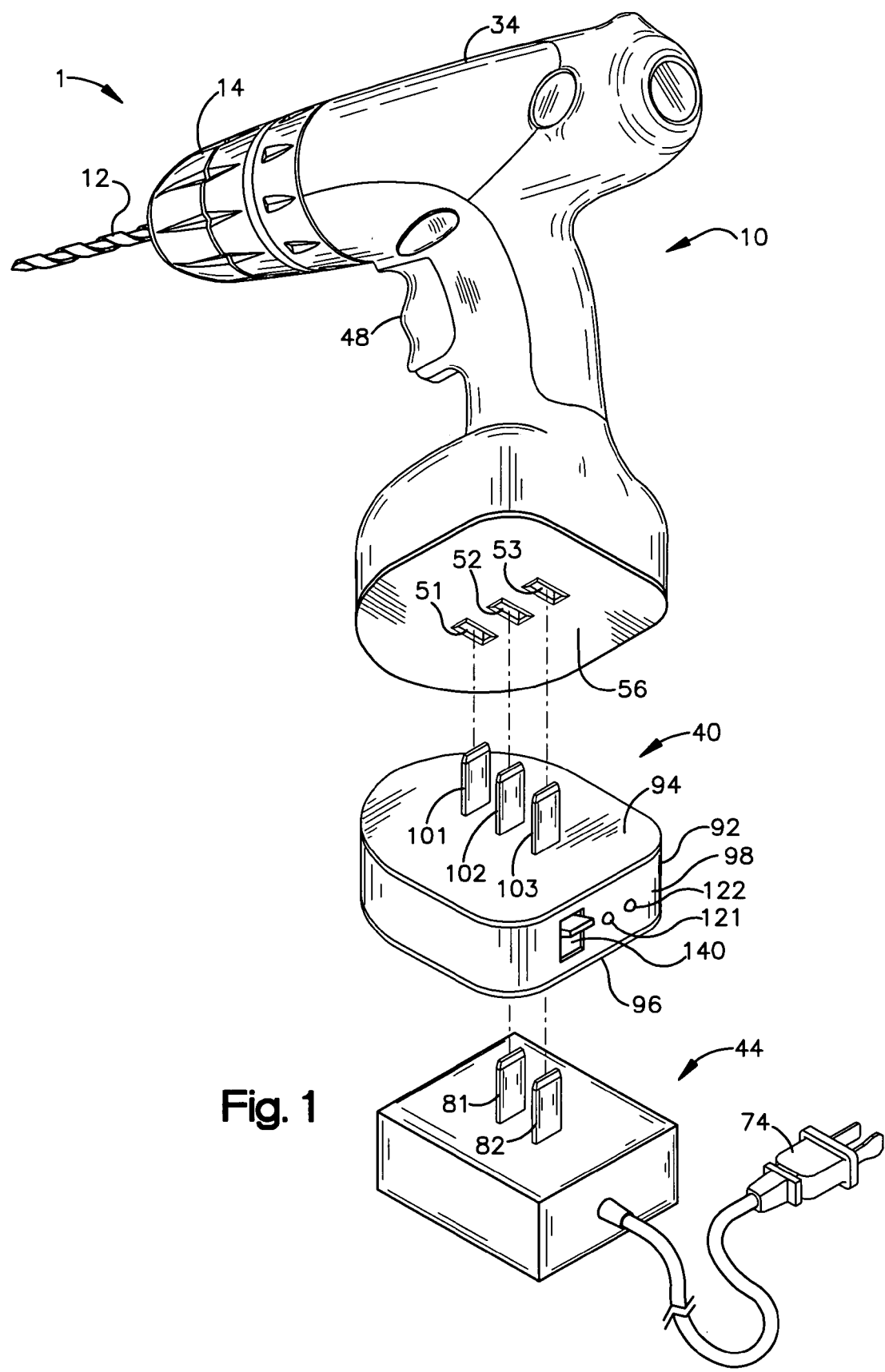
FIG. 1 is a perspective view of a first tool, an auxiliary battery pack and a battery charger.
Figure 2:
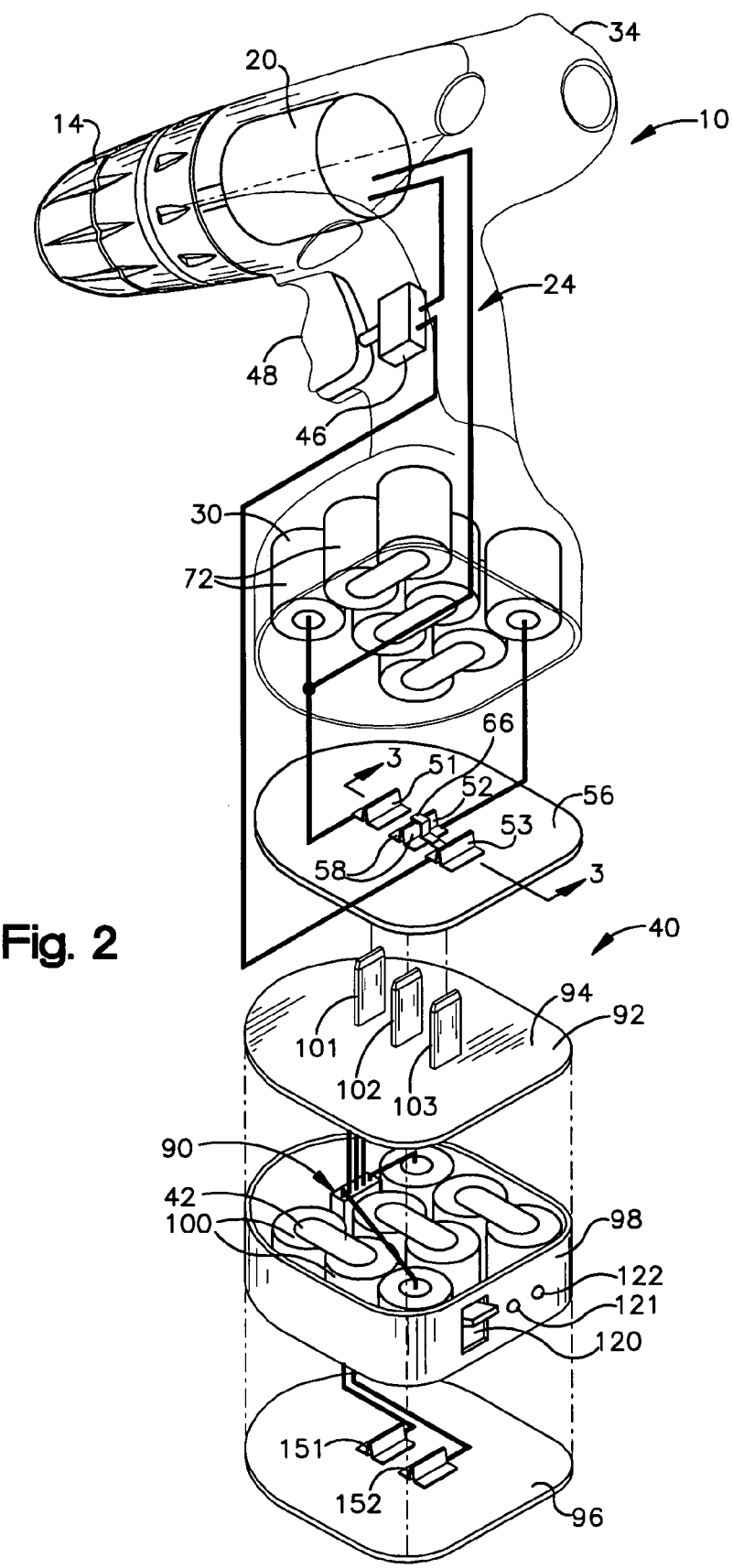
FIG. 2 is an exploded view of the tool and the auxiliary battery pack.

A first apparatus 1 is shown in FIG. 1. It includes a handheld battery-powered tool 10. In the example, the tool 10 is a drill used to rotate a drill bit 12. The drill has a chuck 14 that grasps the drill bit 12. As shown in FIG. 2, the drill 10 further has a motor 20, a primary electrical circuit 24 and a primary battery 30 all housed in a housing 34. The motor 20 rotates the chuck 14. The primary circuit 24 conducts electrical current from the primary battery 30 to the motor 20 to power the motor 20. An auxiliary battery pack 40 with a secondary battery 42 can be removably attached to the tool 10 in an attached position. In this position, the secondary battery 42 can be user selectably connected in series or in parallel with the primary battery 30 to respectively boost the voltage or the current provided to the motor 20. This, in turn, respectively boosts motor speed or motor torque. A battery charger 44 (FIG. 1) is used to charge the primary and second batteries 30 and 42.

As shown in FIG. 2, the primary battery 30 in this example comprises eight rechargeable NiCd cells 72 connected in series. This provides nominally 9.6V when the battery 30 is fully charged. The battery 30 is considered to be weak when it provides nominally 8V or less.

The primary circuit 24 includes a trigger switch 46 with a trigger 48, for turning the motor 20 on and off. The trigger switch 46 is normally open and is closed by the trigger 48 being squeezed.

Three input terminal jacks of the primary circuit 24 comprise first, second and third electrical contact clips 51, 52 and 53 located along a bottom wall 56 of the housing 34. Each clip 51, 52 and 53 comprises a pair of flexible metal blades 58 configured grasp and electrically contact a prong inserted between them.

Figure 3:
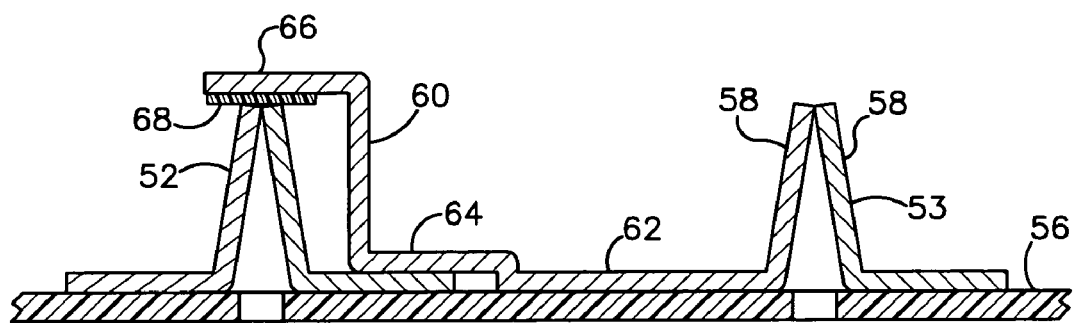
FIG. 3 is a sectional view, taken at line 3—3 of FIG. 2, of a portion of the auxiliary battery pack, shown in an unattached configuration.
Figure 4:
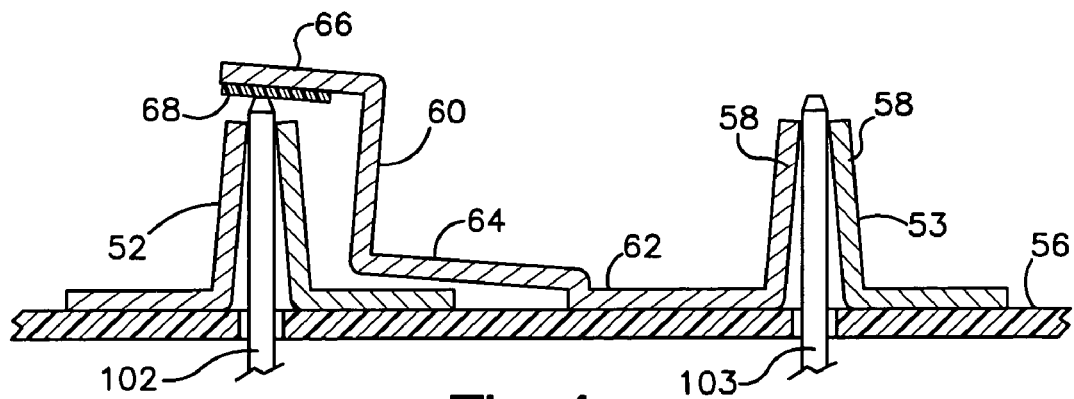
FIG. 4 is a view similar to FIG. 3, with the battery pack shown in an attached configuration.

A shunt switch 60 is connected across the second and third clips 52 and 53. The shunt switch 60 is normally closed and is opened by insertion of a prong into the second jack 52. To effect this, the shunt switch 60 has the structure shown in FIG. 3. The shunt switch 60 comprises a flexible metal tab 62 extending from the third clip 53 to the second clip 52. A lower section 64 of the tab 62 is in abutting contact, and thus electrical contact, with the second clip 52. An upper section 66 of the tab 62 is spaced directly above the second clip 52. The bottom of the upper section 66 is covered by an insulating pad 68. As shown in FIG. 4, when a prong 102 is inserted into the second clip 52, the prong 102 pushes the upper section 66 of the tab 62 upward. This moves with the tab 62 out of contact with the second clip 52, while the tab 62 is insulated from the prong 102 by the pad 68.

Figure 5:
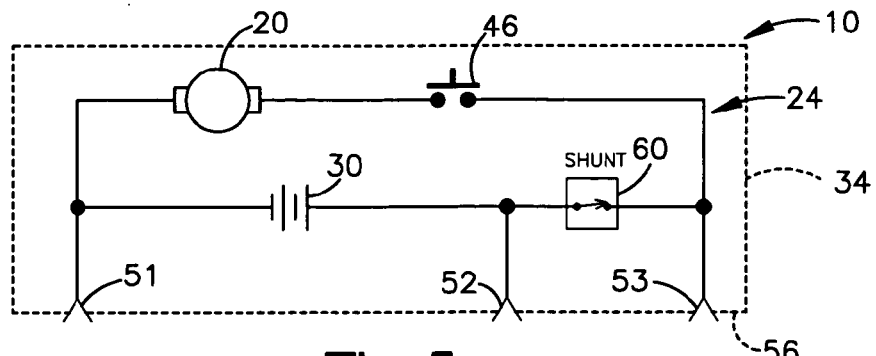
FIG. 5 is a schematic diagram of the tool.

The primary circuit 24 is shown schematically in FIG. 5. The primary battery 30 is connected across the first and second clips 51 and 52. The motor 20 and the trigger 46 are connected in series across the first and third clips 51 and 53. The shunt switch 60 is connected across the second and third clips 52 and 53. The shunt switch 60 is normally closed to shunt current from the battery 30 to the motor 20, but is opened when a prong is inserted into the second jack 52.

Figure 6:
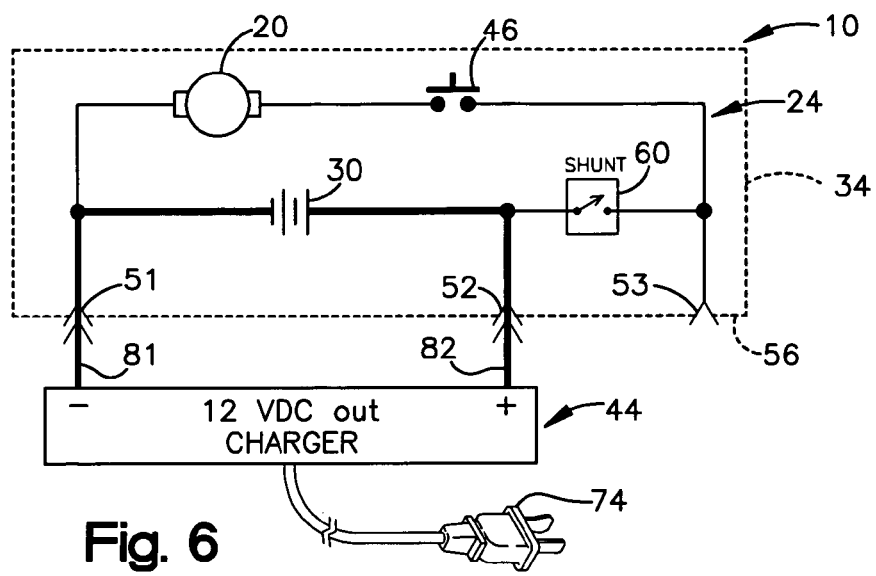
FIG. 6 is a circuit diagram of the tool connected to the battery charger.

The primary battery 30 can be recharged with the charger 44 as schematically illustrated in FIG. 6. The charger 44 inputs wall current at 120 VAC through a wall plug 74. It outputs a DC voltage, typically at 12V, across first and second output terminal prongs 81 and 82 that can be inserted into the first and second jacks 51 and 52. Insertion of the second prong 82 into the second jack 52 opens the shunt switch 60 as explained above. This prevents the charging current from being drained through the motor 20 even if the trigger switch 48 is squeezed. The current path is indicated by a thick line. It extends across the input jacks 51 and 52 through the primary battery 30 to charge the battery 30.

The auxiliary battery pack 40 is shown in FIG. 2. It is "auxiliary" in that it is not required for powering the drill 10, because the drill 10 can be powered solely by its own internal primary battery 30. The battery pack 40 includes the secondary battery 42 and a secondary circuit 90 all encased in a housing 92.

The housing 92 has top, bottom and side walls 94, 96 and 98. The housing 92 is configured to be removably and rigidly attached to the primary tool housing 34 to form a single handheld housing structure that can be grasped by hand as a single unit. Accordingly, the entire pack 40 is configured to be removably and rigidly attached to the tool 10 to form a unitary handheld tool structure that can be grasped by hand as a single unit.

Like the primary battery 30, the secondary battery 42 comprises eight rechargeable NiCd cells 100 connected in series to provide 9.6V when fully charged.

First, second and third output terminal prongs 101, 102 and 103 project from the top wall 94 the housing 92. They are configured to respectively plug into the first, second and third input terminal jacks 51, 52 and 53 when the battery pack 40 is in the attached position. The jacks 51, 52 and 53 grasp the prongs 101, 102 and 103 and thus releasably secure the battery pack 40 in the attached position.

Figure 7:
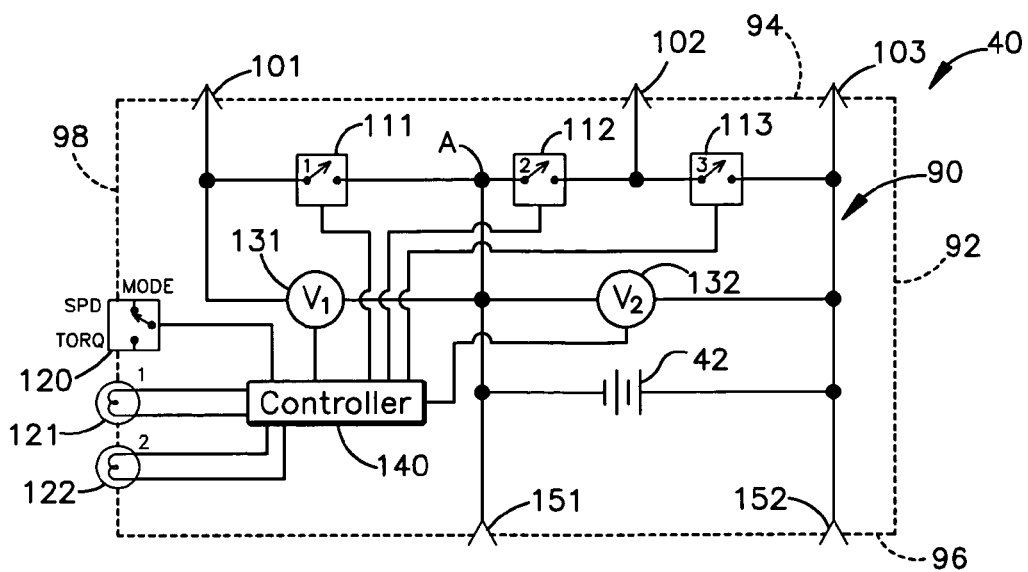
FIG. 7 is a circuit diagram of the auxiliary battery pack.

As shown schematically in FIG. 7, the circuit 90 includes three current controlling switches 111, 112 and 113. They can be mechanical or solid state. In this example they are normally-open reed switches. The first switch 111 connects the first prong 101 to a connection point designated point A. The second switch 112 connects point A to the second prong 102. The third switch 113 connects the second prong 102 to the third prong 103.

A mode select switch 120, typically a slide switch, enables a user to select between two modes of boosting motor output: "boost speed" mode and "boost torque" mode. Boosting speed is typically for using the tool 10 to drive a drill bit, and boosting torque is typically for using the tool 10 to drive a screwdriver bit. The mode selection is achieved through the switch 120 selecting whether the secondary battery 42 will be connected in series or in parallel with the primary battery 30.

First and second low-battery indicators 121 and 122, typically lamps or LEDs, are configured to indicate which, if any, battery 30 or 42 (FIG. 2) is weak.

A first voltage sensor 131, such as an A/D converter, connects the first prong 101 to point A. The sensor 131 measures a first voltage $V_1$ representing the voltage across the primary battery 30 (FIG. 2) when the battery pack 40 is attached to the tool 10. A second voltage sensor 132, connected in parallel with the secondary battery 42, connects point A to the third prong 103. This sensor 132 measures a second voltage $V_2$ representing the voltage across the secondary battery 42.

A controller 140 communicates with each of the electrical components 111, 112, 113, 120, 121, 122, 131 and 132 mentioned above to control operation of the pack 40. For example, the controller 140 inputs signals from the voltage sensors 131 and 132 to monitor the battery voltages $V_1$ and $V_2$ in order to determine which, if any, of the batteries 30 or 42 is weak. The controller 140 inputs the user's choice of boost mode from the mode select switch 120. Based on these inputs, the controller 140 closes selected ones of the three current controlling switches 111, 112 and 113 according to a control scheme presented in the following table. In this scheme, the battery voltages $V_1$ and $V_2$ are compared to predetermined first and second threshold values $V_{T1}$ and $V_{T2}$. In this example, both $V_{T1}$ and $V_{T2}$ equal 8V. The corresponding battery 30 or 42 is considered weak if its voltage falls below the corresponding threshold value. The controller 140 also powers the appropriate low-battery indicator 121 or 122 to indicate which battery 30 or 42 is weak.

Figure 10:
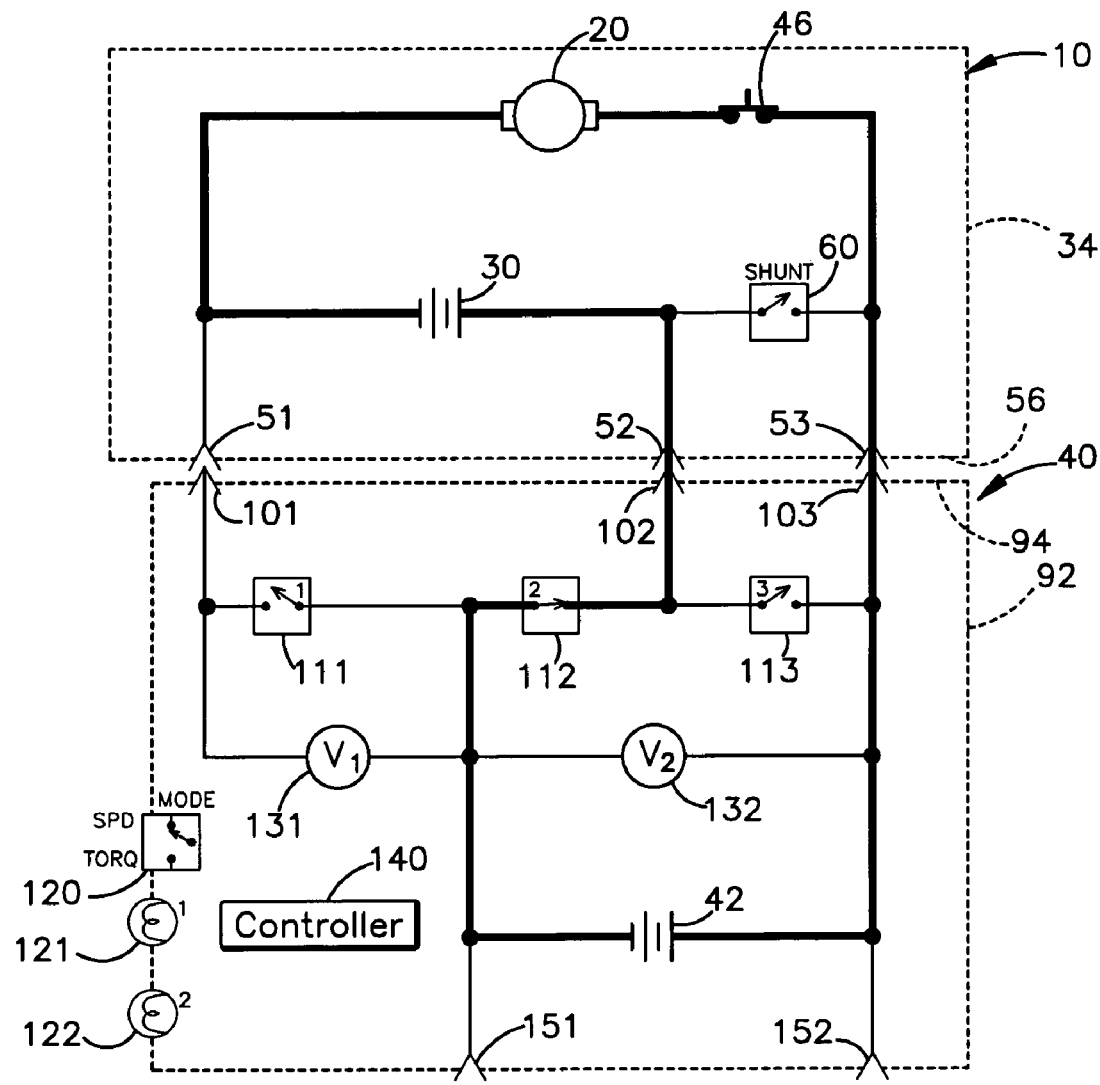
FIG. 10 is a circuit diagram of the tool and the battery pack attached together and used in a first mode of operation.

The resulting current flow path is shown in FIG. 10 as a thick line. Relative to using a single battery, using both batteries 30 and 42 in series approximately doubles the voltage applied across the motor 20, thereby approximately doubling the motor speed.

As the batteries 30 and 42 power the motor 20, the controller 140 monitors the first and second battery voltages $V_1$ and $V_2$ individually. In this example, at some point while the motor 20 is running, the first voltage $V_1$, which is the voltage across the first and second prongs 101 and 103, Control Scheme Table

| Controller Input | | Controller Output to: | | | | | Resulting Current Path | |
|---|---|---|---|---|---|---|---|---|
| Selected Mode | Condition of $V_1$ and $V_2$ | First Switch | Second Switch | Third Switch | First Lamp | Second Lamp | Battery configuration | Shown in Fig. |
| boost speed | $V_1 > V_{T1}$; $V_2 > V_{T2}$ | open | close | open | — | — | series | 10 |
| boost speed | $V_1 < V_{T1}$; $V_2 > V_{T2}$ | close | open | open | light | — | secondary only | 11 |
| boost speed | $V_1 > V_{T1}$; $V_2 < V_{T2}$ | open | open | close | — | light | primary only | 12 |
| boost torque | Any Condition | close | open | close | — | — | parallel | 13 |

Figure 8:
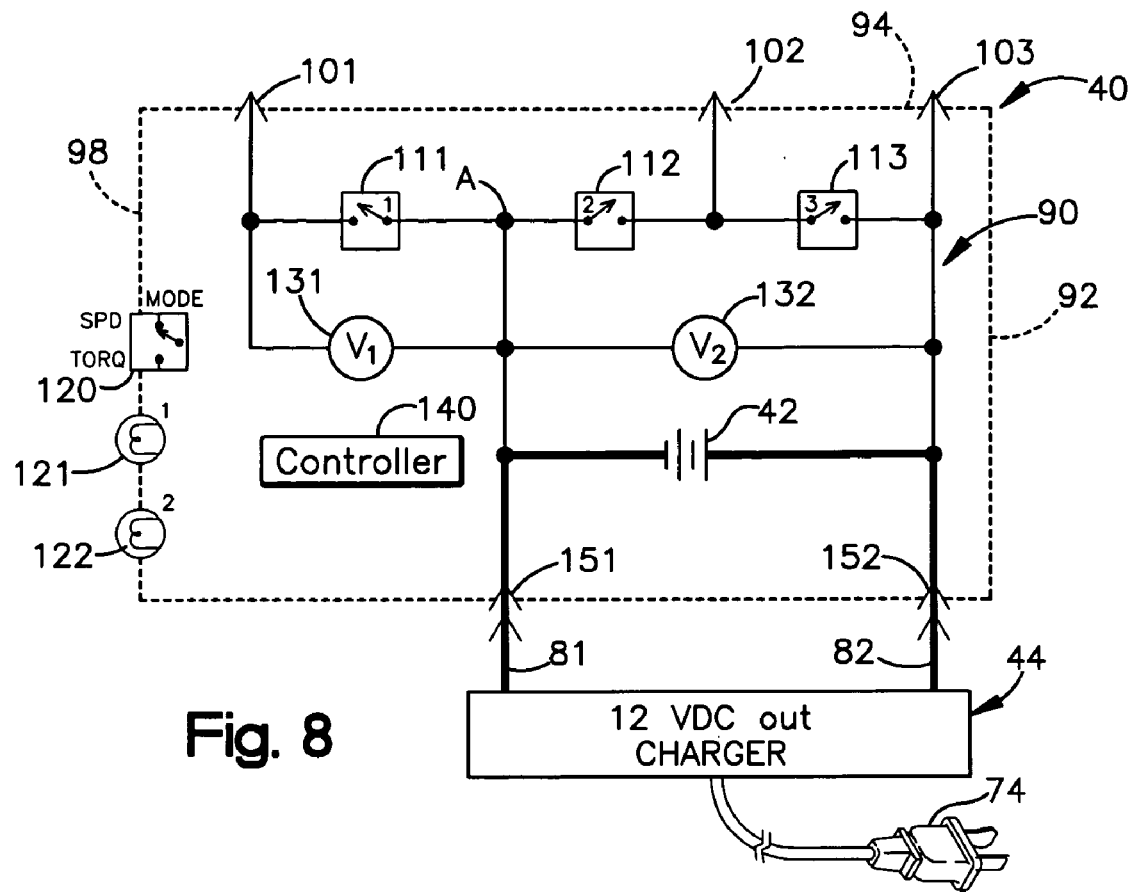
FIG. 8 is a circuit diagram of the auxiliary battery pack connected to the battery charger.

First and second input terminal jacks 151 and 152 are located along a bottom wall 96 of the battery pack 40. They are used for charging the secondary battery 42 with the battery charger 44, as shown in FIG. 8. In this and other figures, connections between the controller 140 and other components are omitted for clarity. The first and second input terminal jacks 151 and 152 are configured to mate with the first and second output terminal prongs 81 and 82 of the battery charger 44. The current path, indicated by a thick line, extends across the jacks 151 and 152 through the secondary battery 42 to charge the battery 42.

Figure 9:
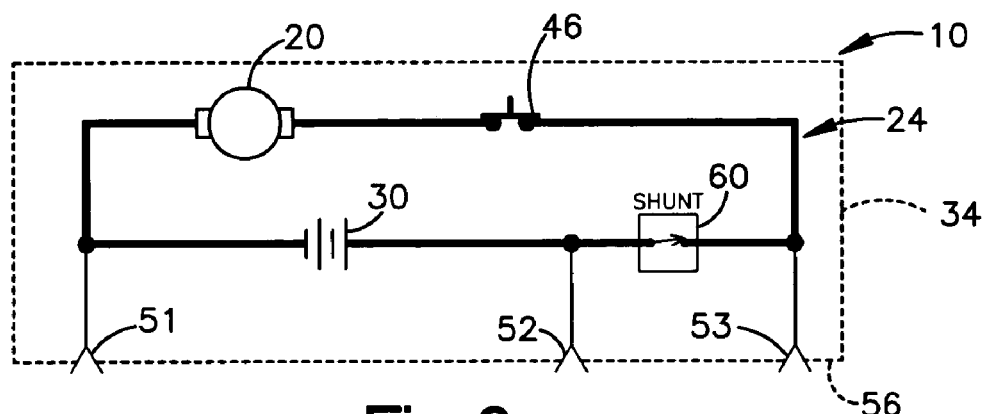
FIG. 9 is a circuit diagram of the tool being used without the battery pack.

Operation of the first apparatus 1 (FIG. 1) is explained by the following example, comprising a typical sequence of events. First, a user charges the primary battery 30 by connecting the tool 10 to the charger 44 as shown in FIG. 6. After the battery 30 is fully charged, the user removes the tool 10 from the charger 44 and grasps it in his hand without the battery pack 40 attached. The user squeezes the trigger 48 (FIG. 2), which closes the trigger switch 46 to power the motor 20. The resulting current flow path is represented as a thick line in FIG. 9. The shunt switch 60 is in its normally closed position, and the motor 20 is powered solely by the primary battery 30.

Next, the user does the following to boost motor speed. The user charges the battery pack 40 by connecting it to the charger 44 as shown in FIG. 8. After the battery pack 40 is fully charged, the user removes the battery pack 40 from the charger 44.

Figure 11:
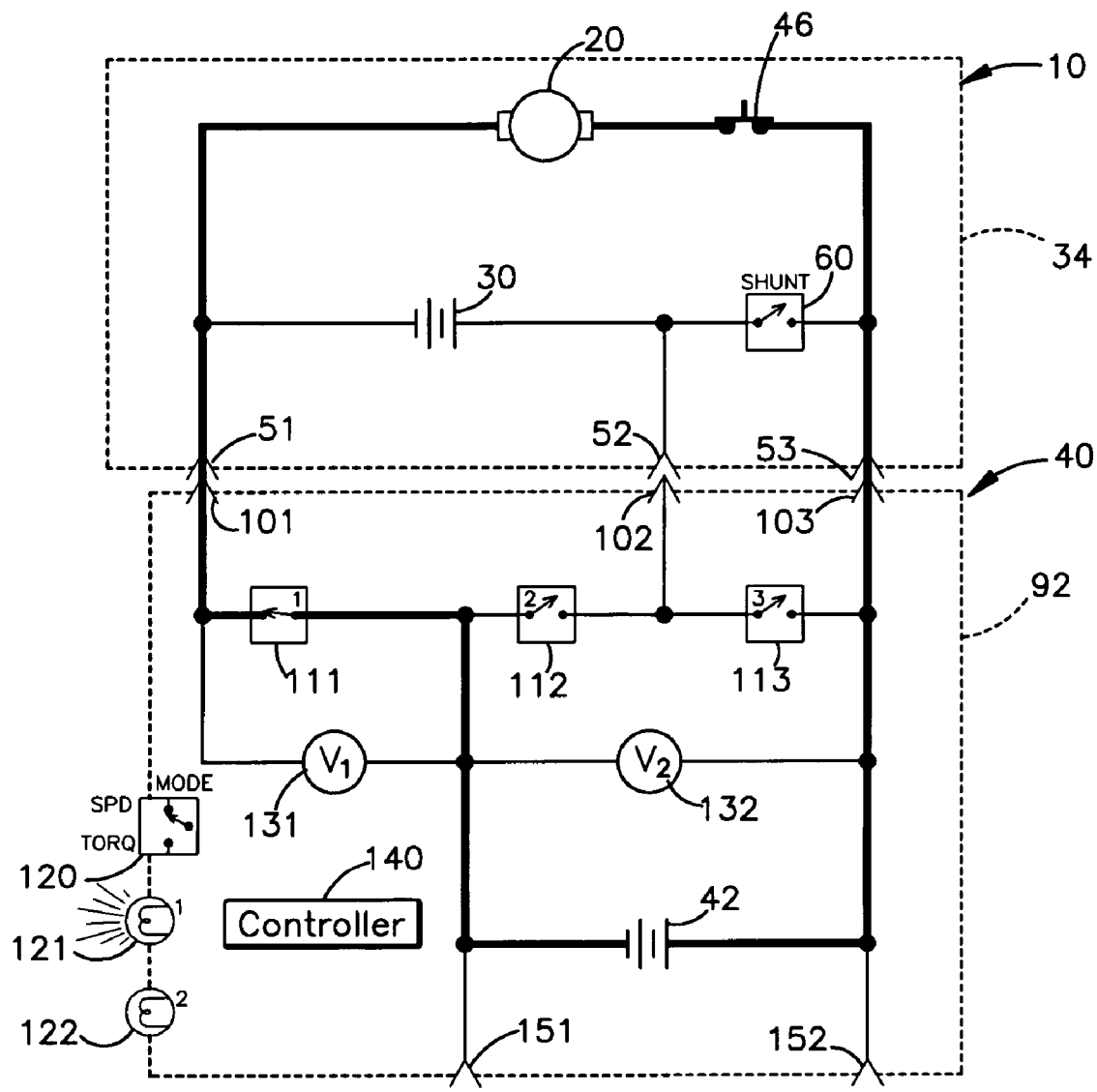
FIG. 11 is a circuit diagram of the tool and the battery pack attached together and used in a second mode of operation.

Then, the user attaches the battery pack 40 to the tool 10 as shown in FIG. 10. The user sets the mode select switch 120 to "boost speed", which closes the second switch 112 in accordance with the control scheme. The secondary battery 42 is connected in series with the primary battery 30 and the motor 20 by, and immediately upon, the insertion of the prongs 101–103 into the jacks 51–53. The switches 111–113 connect the secondary battery 42 across the second and third prongs 102 and 103. The user then squeezes the trigger 48.

drops below the first threshold voltage $V_{T1}$, indicating the primary battery 30 is weak. Continued operation with both batteries 30 and 42 in series might lead to over-discharging or reverse charging of the weak battery 30. To avoid this, as shown in FIG. 11, the controller 140 opens the second switch 112 and closes the first switch 111 in accordance with the control scheme. The secondary battery 42 is thus connected across the first and third prongs 101 and 103, leaving the second prong 102 unpowered. This effectively diverts the current around the weak primary battery 30, thereby taking it off line, while continuing to power the motor 20 with the still-strong second battery 42. The motor 20 continues running, but at a slower rate. The controller 140 lights the first lamp 121 to notify the user that the primary battery 30 is weak and has been taken off line.

Next, in this example, the user removes the battery pack 40 from the tool 10 and recharges the tool 10 in the manner explained above. The user then re-attaches the battery pack 40 to the tool 10 and squeezes the trigger 46. The resulting current path is shown in FIG. 10, with the motor 20 being powered by both batteries 30 and 42 in series as before.

Figure 12:
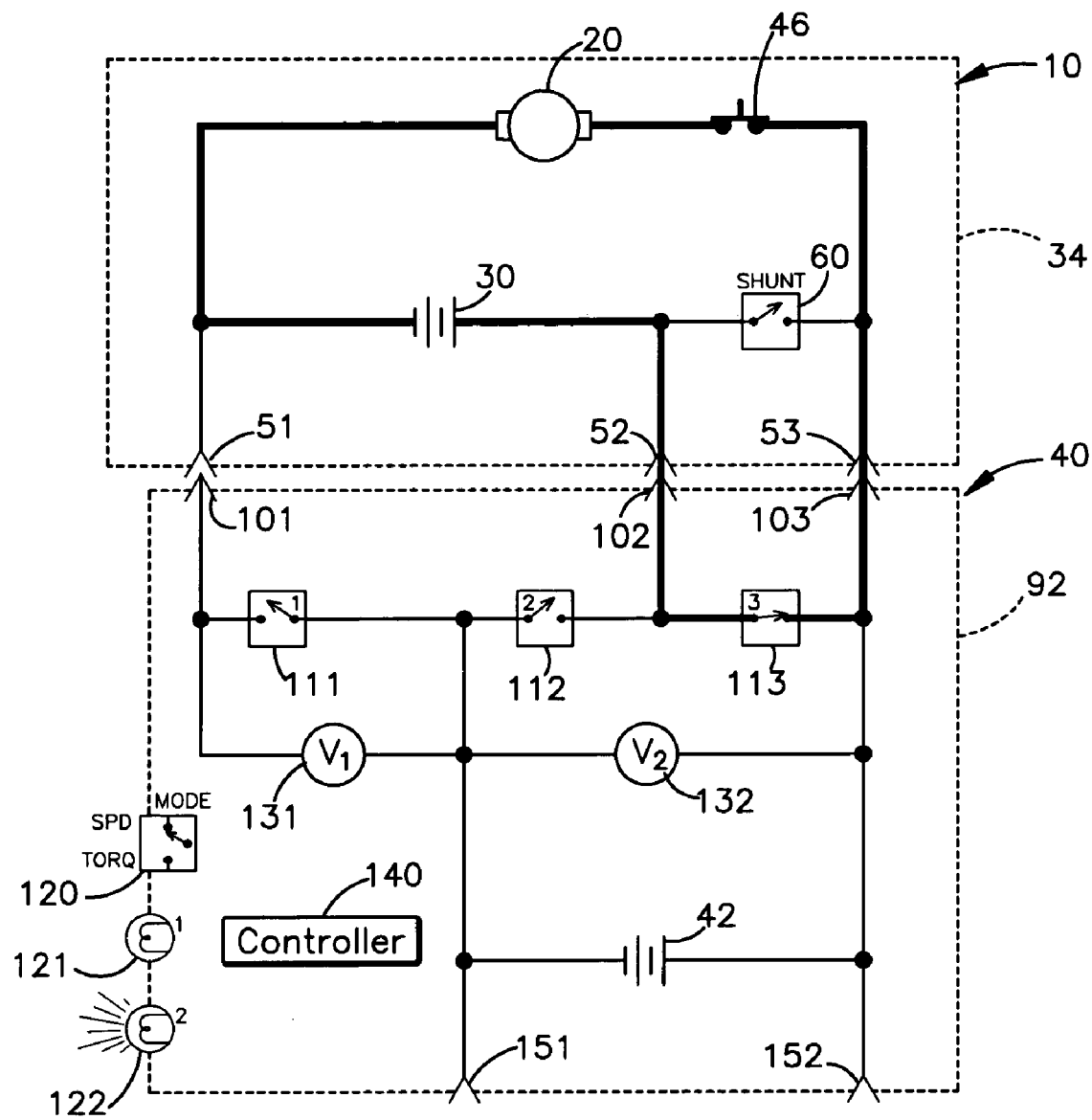
FIG. 12 is a circuit diagram of the tool and the battery pack attached together and used in a third mode of operation.

However, this time, as the tool 10 is being used, the second voltage $V_2$ drops below the second threshold $V_{T2}$. In response, as shown in FIG. 12, the controller 140 opens the second switch 112 and closes the third switch 113 in accordance with the control scheme. The secondary circuit 90 thus shorts the second and third prongs 102 and 103 together. This effectively diverts the current around the weak secondary battery 42 while continuing to power the motor 20 with the still-strong primary battery 30. This avoids over-discharging or reverse charging the secondary battery 42. The motor 20 continues running, but at a slower rate. The controller 140 lights the second lamp 122 to notify the user that the secondary battery 42 is weak and has been taken off line.

Comparison of FIGS. 10 and 12 shows that, in either scenario, the secondary circuit 90 provides a conduction path from the second prong 102 to the third prong 103. The conduction path is through the secondary battery 42 (per FIG. 10) as long the secondary battery voltage $V_2$ is above the threshold $V_{T2}$ and is diverted (per FIG. 12) around the secondary battery 42 when the voltage $V_2$ drops below the threshold level $V_{T2}$.

Figure 13:
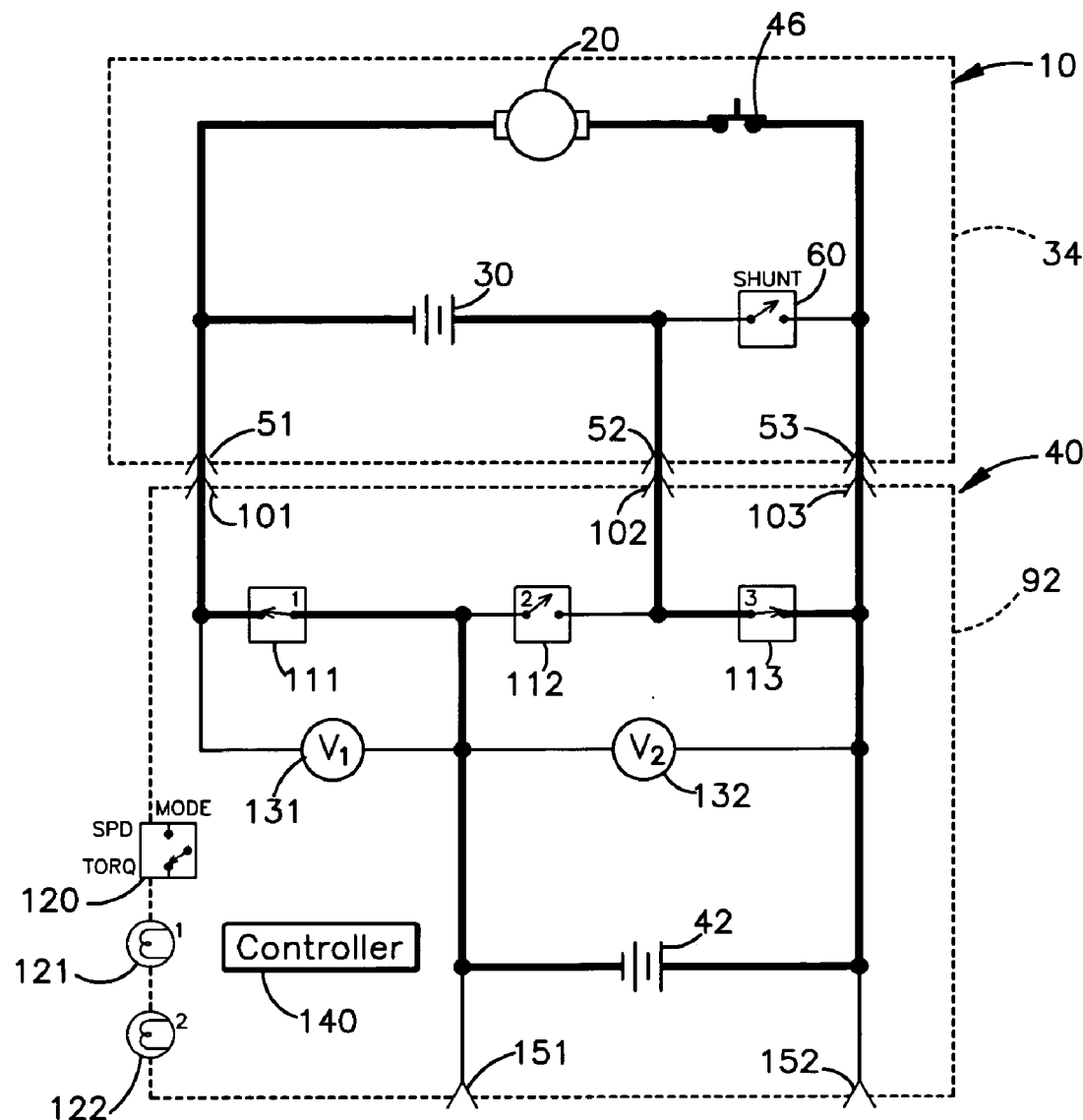
FIG. 13 is a circuit diagram of the tool and the battery pack attached together and used in a fourth mode of operation.

Next, in this example, the user recharges the tool 10 and re-attaches the battery pack 40. This time, the user switches the mode switch to "boost torque" as shown in FIG. 13. In response, the controller 140 closes only the first and third switches 111 and 113, in accordance with the control scheme. This causes the current to flow through the batteries 30 and 42 in parallel. Relative to using only one battery, this parallel configuration increases the current available to the motor 20 and thus achievable torque. It also extends battery life.

With the batteries 30 and 42 connected in parallel, the first and second battery voltages $V_1$ and $V_2$ are equal and cannot be used to indicate which battery, if any, is weak. Therefore, while running the motor 20 with the batteries 30 and 42 in parallel, the controller 140 periodically briefly resets the switches 111, 112 and 113 to place only the primary battery 30 under load. The controller 140 then measures $V_1$ to determine whether it is below the threshold $V_{T1}$. The controller 140 similarly places only the secondary battery 42 under load and measures $V_2$ to determine whether it is below the threshold $V_{T2}$. If either $V_1$ or $V_2$ is below the respective threshold, the controller 140 lights the corresponding low-battery indicator lamp 121 or 122, but does not take the weak battery off line.

In this example, each low-battery indicator 121 and 122 is a single lamp that indicates only whether or not the respective battery is weak enough to have been taken off line. Alternatively, each indicator 121 and 122 can display a graduated indication of battery strength or remaining capacity. Such an indicator would forewarn the user of the battery becoming weak before it becomes weak enough to be taken off line. It enables the user to estimate how much working time each battery has left. If the graduated indication would extend from "weak" all the way to "fully charged", then the indicator could also be useful when recharging the batteries 30 and 42. The indicator could be in the form of an LED bar graph, with the number of lit LEDs being a function of battery strength. Only a single LED, different in color than the others, could be lit when the battery is taken off line.

Alternatively, the controller 140 could indicate battery strength through use of a single LED that is continuously lit when the battery is strong, blinking when the battery is weak, and off when the battery is very weak or dead. The blinking could have a duty cycle, defined as on-time/(on-time+off-time), that is a function of battery strength. For example, the duty cycle can equal V/(full charge), full charge being 9.6V in this example.

In the preferred embodiment, the tool 10 is a drill in which the load is a motor 20. Alternatively, the tool 10 can be different than a drill, and the load can be different than a motor 20. For example, the tool 10 can be a flashlight in which the load is a light bulb. In such an example, the boost would be in brightness when the batteries are in series and in battery life when the batteries are parallel.

In the preferred embodiment, the secondary circuit 90 located in the battery pack housing 92 is configured to perform the functions of implementing the user-selected mode, monitoring the battery voltages, taking the weak battery off line and indicating which battery is weak. Alternatively, some or all of these functions can be performed by the primary circuit 92 in the tool housing 34 (FIG. 2) or by a circuit located outside both housings 34 and 92.

Second Apparatus

Figure 14:
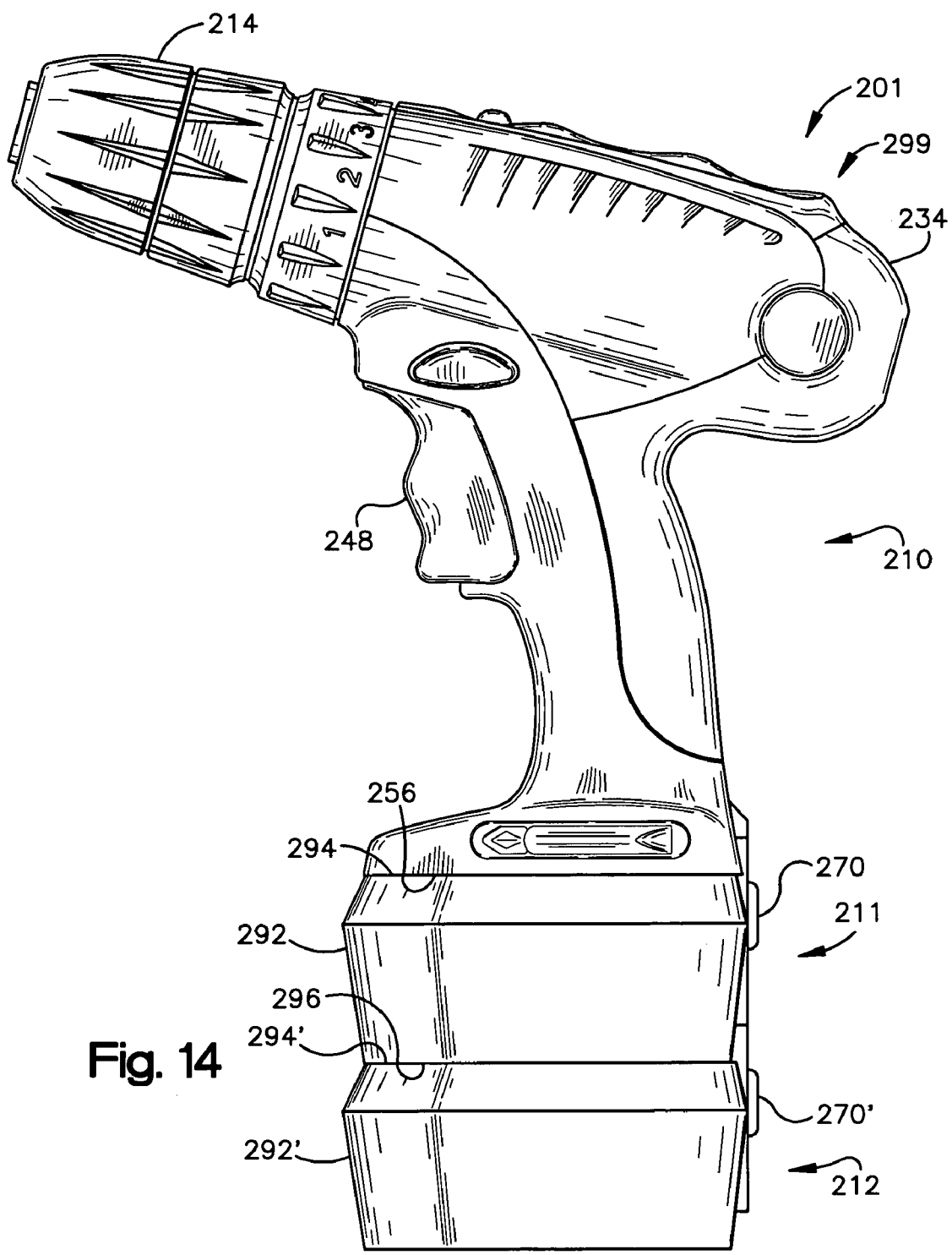
FIG. 14 is a perspective view of a second tool and first and second battery packs, shown attached together.
Figure 15:
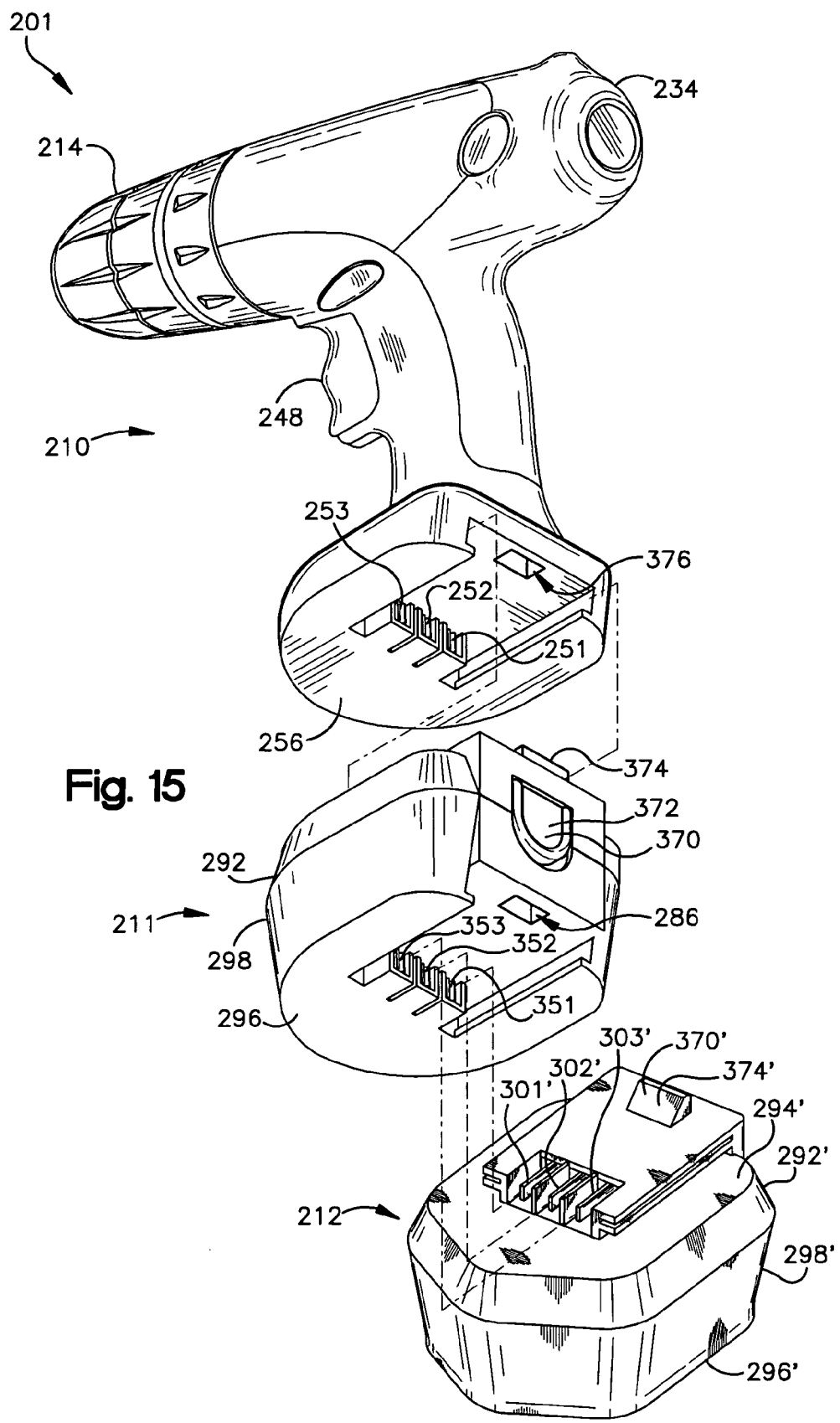
FIG. 15 is a perspective view of the second tool and the battery packs, shown separated from each other.

A second apparatus 201 is shown in FIG. 14. Like the first apparatus 1 (FIG. 1), the second apparatus 201 includes a handheld battery-powered tool 210, specifically a drill. It further includes first and second battery packs 211 and 212. Each battery pack 211 and 212 is configured to be removably attached to the tool 210 by itself, in the absence of the other pack, to power the tool 210 by itself. The packs 211 and 212 are further configured to be removably attached to the tool 210 together, stacked one under the other as shown in FIG. 14. They can then jointly power the tool 210, either in series or in parallel as selected by the user. Alternatively, as shown in FIG. 15, both packs 211 and 212 can be detached from the drill 210 and from each other.

Figure 16:
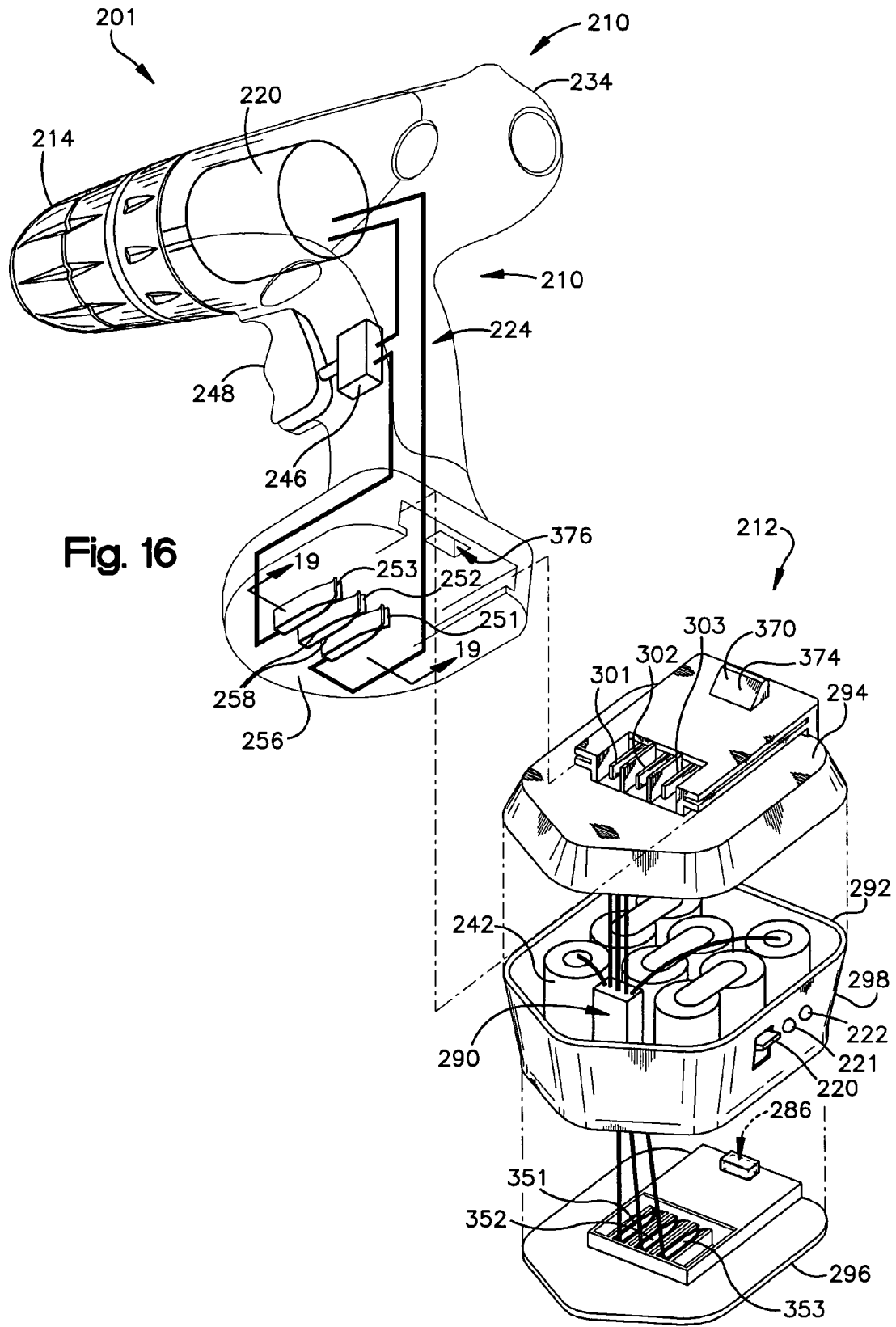
FIG. 16 is an exploded view of the second tool and the first battery pack.

As shown in FIG. 16 the drill 210 has a chuck 214, a motor 220, a primary electrical circuit 224 and a housing 234. Unlike the drill 10 of the first apparatus 1, this drill 210 does not have a primary battery. It instead receives all of its electrical power from the first and second battery packs 211 and 212.

Like the primary circuit 24 of the first apparatus 1, the primary circuit 224 of the second apparatus 201 includes a normally-open trigger switch 246 with a trigger 248, for turning the motor 220 on and off.

Figure 17:
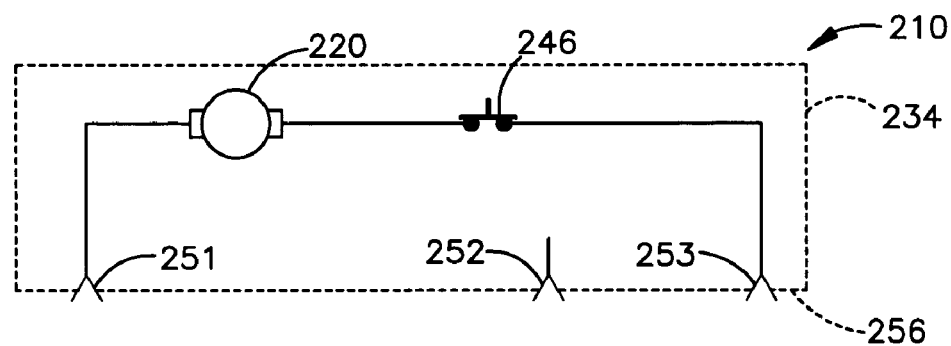
FIG. 17 is a circuit diagram of the second tool.

The circuit 224 further includes three input terminal jacks comprising first, second and third electrical contact clips 251, 252 and 253 located along a bottom wall 256 of the tool housing 234. Each clip 251, 252 and 253 comprises a pair of metal blades 258 configured to grasp and electrically contact a prong inserted between them. As shown in FIG. 17, the motor 220 and the trigger switch 246 are connected in series from the first jack 251 to the third jack 253. The second jack 252 has no electrical connection.

In this example, the first and second battery packs 211 and 212 shown in FIG. 15 are alike. Accordingly, they have like components designated by the same reference numerals. However, reference numerals of components of the first pack 211 are unprimed, whereas reference numerals of components of the second pack 212 are primed. The packs 211 and 212 are described as follows with reference to the first battery pack 211.

As shown in FIG. 16, the first battery pack 211 includes a battery 242 and a circuit 290 all housed in a housing 292. The battery 242 is like the secondary battery 42 of the first apparatus 1 (FIG. 2). The housing 292 has top, bottom and side walls 294, 296 and 298. As illustrated in FIG. 14, the housings 292 of the first and second packs 211 and 212 are configured to be removably and rigidly attached together and to the tool housing 234 to form a single handheld housing structure 299.

As shown in FIG. 16, first, second and third output terminal prongs 301, 302 and 303 project from the top wall 294 of the housing 292. The prongs 301, 302 and 303 are configured to plug into the three input terminal jacks 251, 252 and 253 of the tool 210 when the pack 211 attached to the tool 210. The prongs 301, 302 and 303 are grasped by and between the blades 258 of the jacks 251, 252 and 253.

Figure 18:
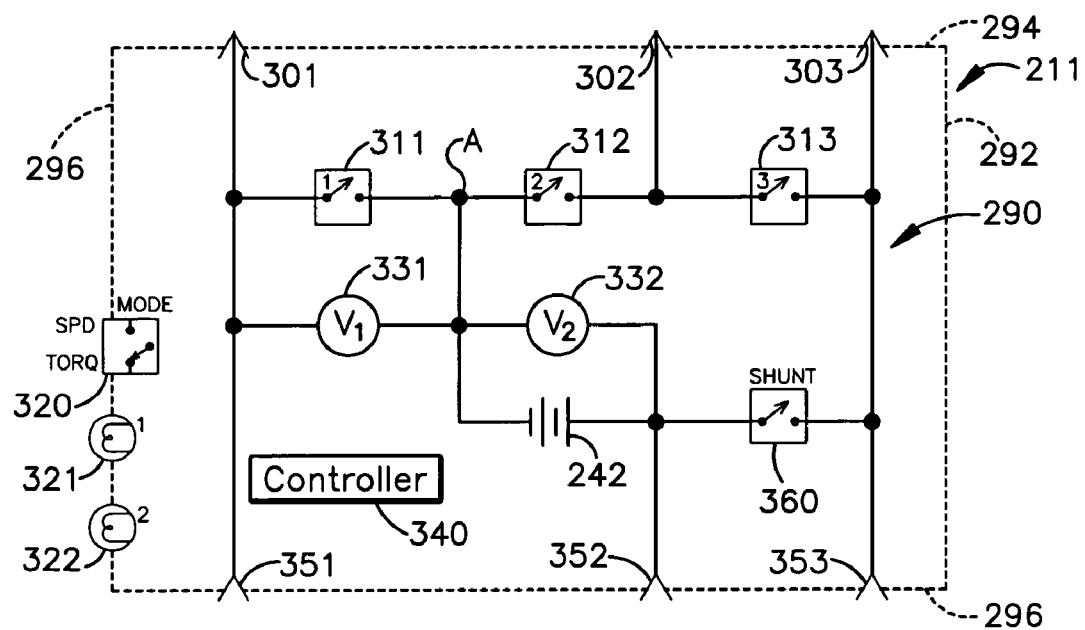
FIG. 18 is a circuit diagram of the first battery pack.

A schematic diagram of the battery pack circuit 290 is shown in FIG. 18. It includes three current controlling switches 311, 312 and 313 like the switches 111, 112 and 113 (FIG. 7) of the first apparatus. The first switch 311 connects the first prong 301 to a connection point A. The second switch 312 connects point A to the second prong 302. The third switch 313 connects the second prong 302 to the third prong 303.

A mode select switch 320 is like the mode select switch 120 (FIG. 7) of the first apparatus. First and second low-battery indicator lamps 321 and 322 are like the lamps 121 and 122 of the first apparatus. First and second voltage sensors 321 and 322 are like the first and second voltage sensors 131 and 132 of the first apparatus.

A controller 340 is like the controller 140 of the first apparatus 1. The controller 340 closes selected ones of the current controlling switches 311, 312 and 313 according to the control scheme presented in the above table. The controller 340 also powers the appropriate lamp 321 and 322 to indicate which battery pack 211 and 212 has a weak battery.

First, second and third input terminal jacks 351, 352 and 353 are located along at the bottom wall 296 of the pack 211. The first jack 351 is connected to the first prong 301. The third jack 353 is connected to the third prong 303. The second prong 352 is connected to point A through the battery 242. The three input jacks 351, 352 and 353 have the same configuration as the three input jacks 251, 252 and 253 of the tool 210. They are thus configured to receive output prongs 301, 302 and 303 of the other battery pack 212 when the packs 211 and 212 are stacked.

Figure 19:
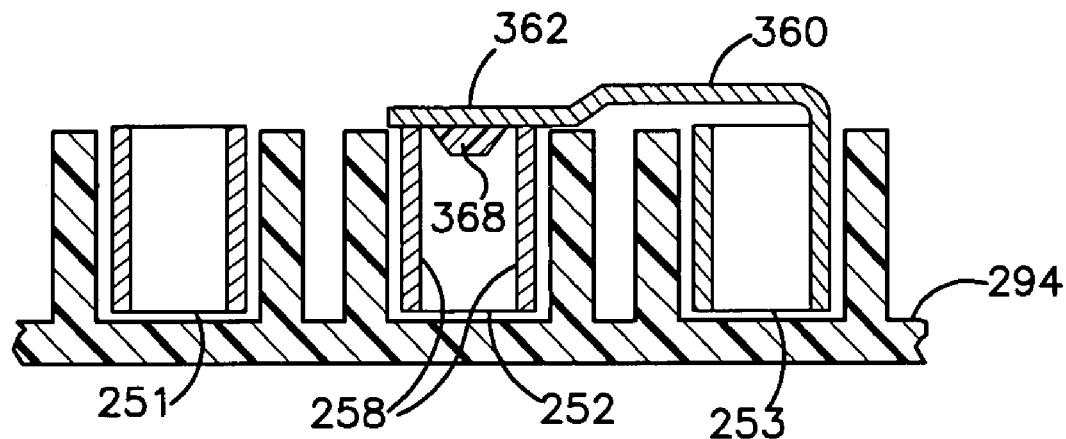
FIG. 19 is a sectional view, taken at line 19—19 of FIG. 16, of a portion of the first battery pack, shown in an unattached configuration.
Figure 20:
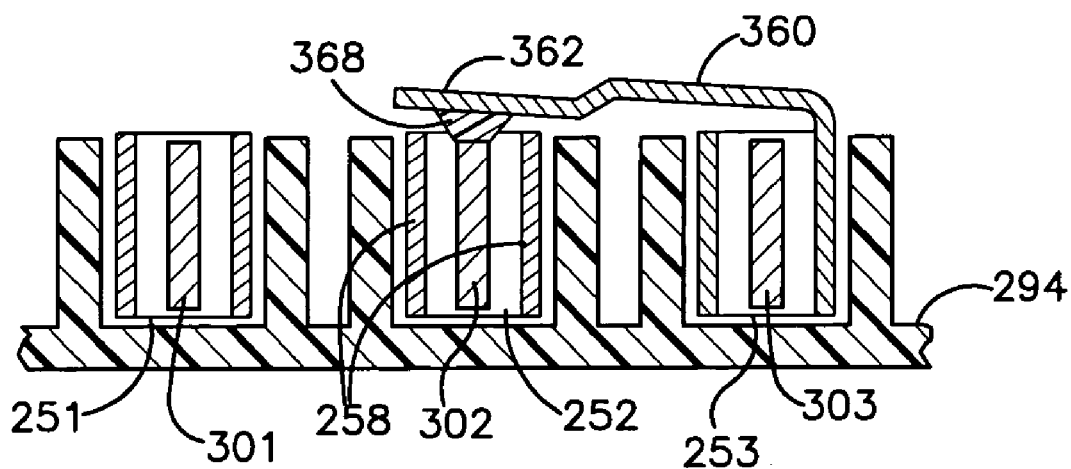
FIG. 20 is a view similar to FIG. 19, with the first battery pack shown in an attached configuration.

A shunt switch 360 is connected across the second and third input jacks 252 and 253. The function and operation of the shunt switch 360 is similar to that of the shunt switch 60 (FIG. 7) of the first apparatus. Specifically, it is normally closed and is opened by insertion of a prong into the second jack 252. To achieve this, as shown in FIG. 19, the shunt switch 60 comprises a flexible metal tab 362 extending from the third jack 253 to the second jack 252. The tab 362 is normally in physical and electrical contact with the second jack 252. As shown in FIG. 20, it is moved out of contact with the second jack 252 by insertion of a prong 302 into the second jack 252. An insulating pad 368 insulates the tab 362 from the prong 302.

Figure 21:
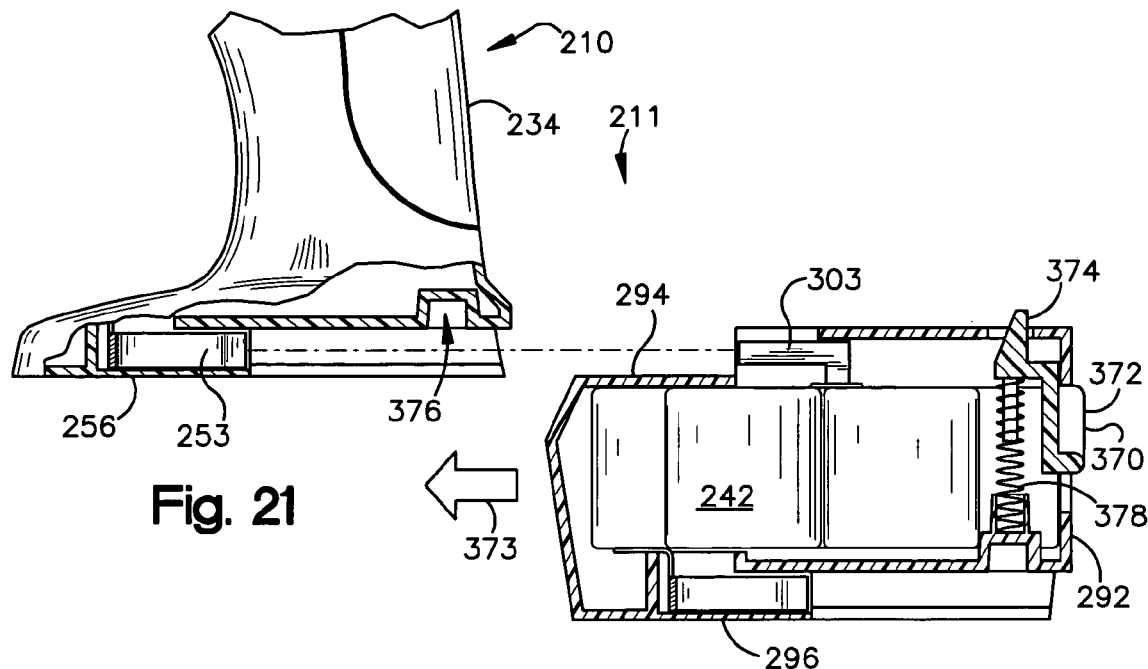
FIG. 21 is a sectional view of the first battery pack, shown being attached to the second tool.

As shown in FIG. 21, the housing 292 includes a spring-loaded latch 370 with a slidable release button 372. The latch 379 is configured for attaching the pack 211 to the tool 210. This is done, as indicated by an arrow 373 in FIG. 21, by moving the pack 211 forward, with the top wall 294 of the pack housing 292 sliding up against the bottom wall 256 of the tool housing 234. This movement inserts the prongs 301, 302 and 303 into the jacks 251, 252 and 253 of the tool 210.

Figure 22:
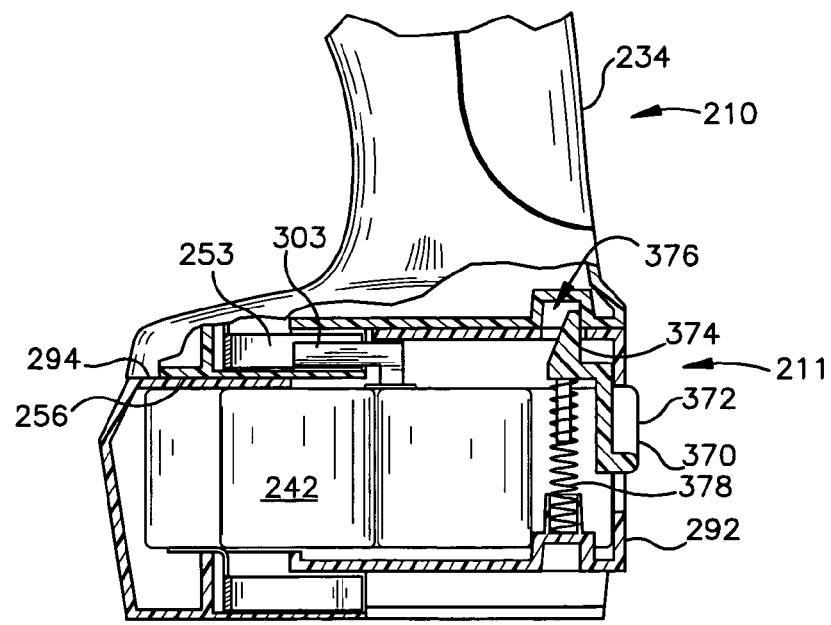
FIG. 22 is view similar to FIG. 21, with the first battery pack fully attached to the second tool.

When the pack 211 is fully attached, as shown in FIG. 22, a wedge 374 of the latch 370 snaps into a recess 376 in the bottom wall 296 of the tool 210, thus locking the pack 211 in place. The wedge 374 is urged upward by a spring 378 to retain the wedge 374 in the recess 376. To release the pack 211, the wedge 376 is retracted from the recess 376 by pushing the release button 372 downward by thumb.

Figure 23:
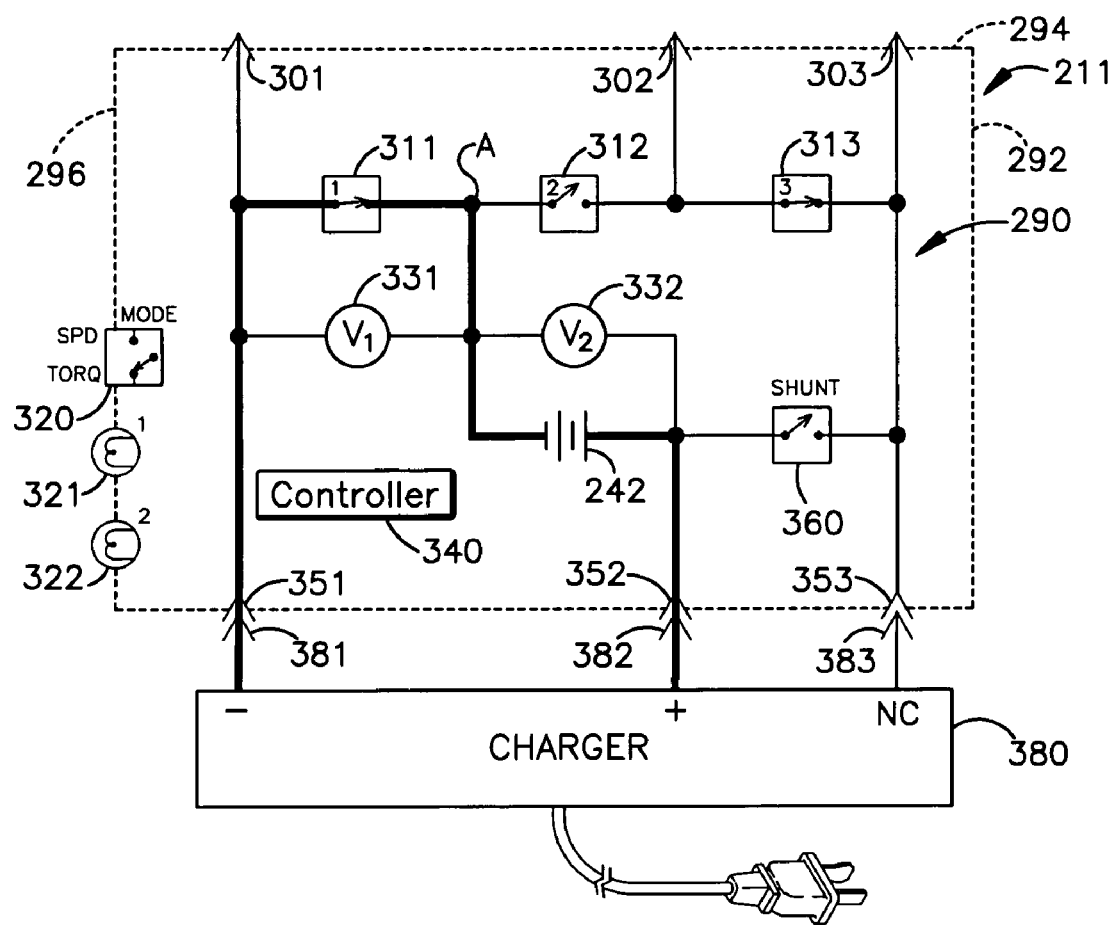
FIG. 23 is a circuit diagram of the first battery pack being charged by a battery charger.

Operation of the second apparatus 201 is explained by the following example, comprising a typical sequence of events. First, a user charges the battery 242 by connecting the first pack 211 to a charger 380 shown schematically in FIG. 23. This charger 380 differs from the charger 44 (FIG. 8) of the first apparatus only in the configuration of its output terminals. Specifically, the charger 380 has three output terminal prongs 381, 382 and 383 like the three output terminal prongs 301, 302 and 303 of the pack 211. The prongs 381, 382 and 383 are configured to plug into the three input jacks 351, 352 and 353 (FIG. 16) of the pack 211. The charger 380 outputs a DC charging voltage, typically 12V, across the first and second prongs 381 and 382. The third prong 383 is not electrically connected within the charger 380 and serves only to help secure the pack 211 to the charger 380. The current path is indicated by a thick line. It extends across the jacks 381 and 382 through the battery 242 to charge the battery 242.

Figure 24:
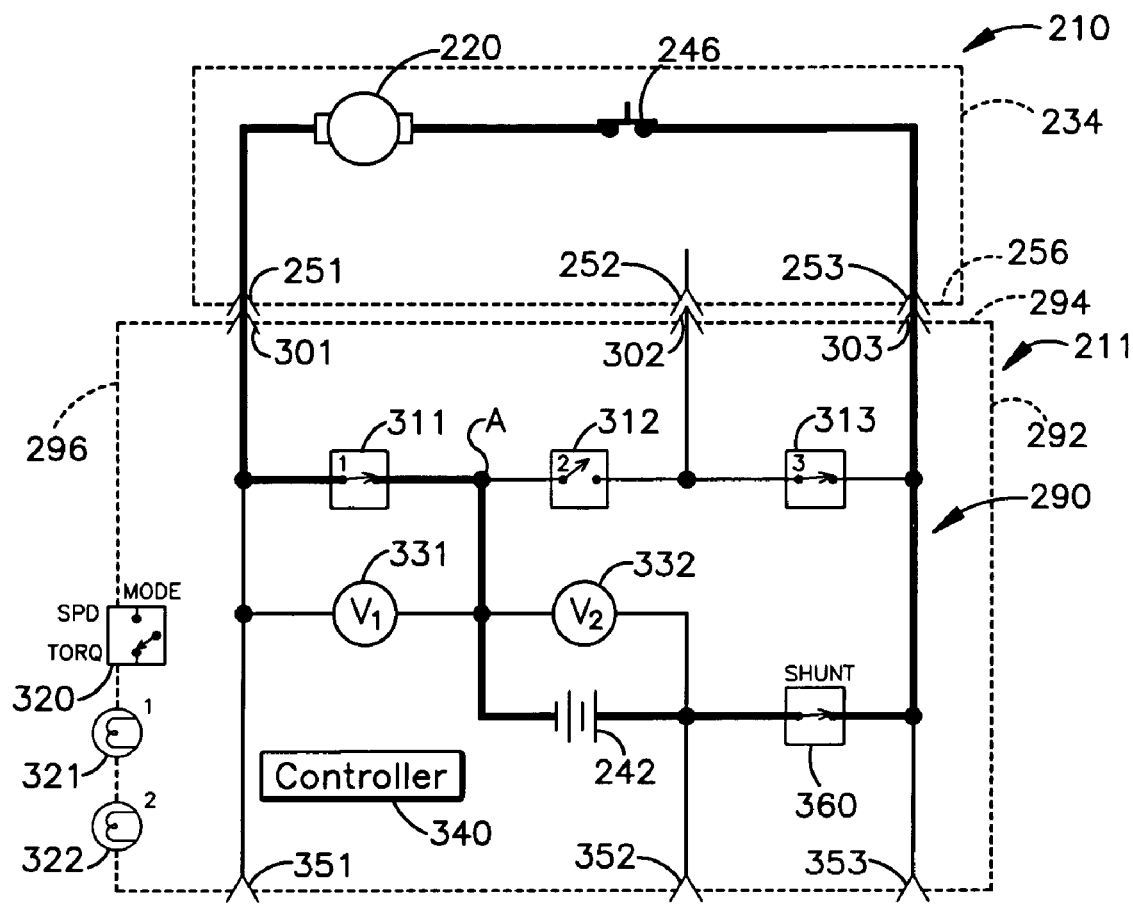
FIG. 24 is a circuit diagram of the second tool and the first battery pack attached together and used in a first mode of operation.

The user then attaches the pack 211 to the tool 210 as described above with reference to FIGS. 21 and 22. As shown in FIG. 24, he sets the mode switch 320 to "boost torque" and squeezes the trigger 248. The current path is indicated with a thick line. A portion of the current path extends from the first output terminal 301 to the third output terminal 303 through the battery 242 to power the tool 210. The tool 210 is thus powered solely through the first battery pack 211.

Figure 25:
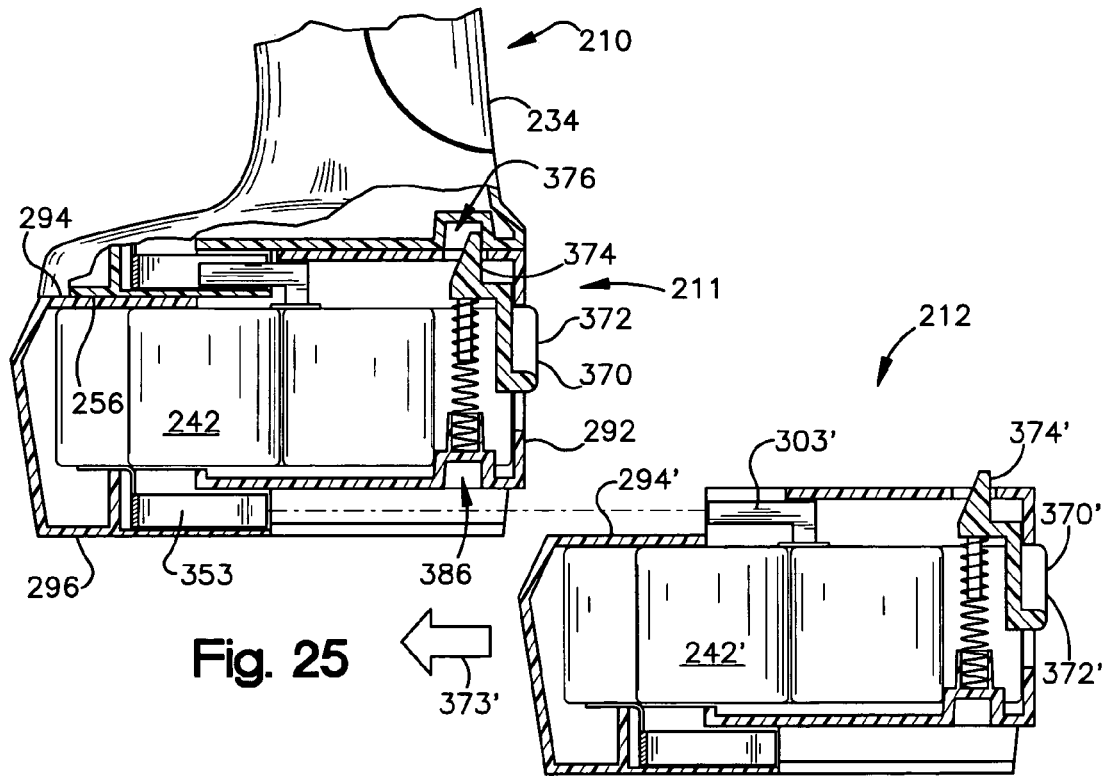
FIG. 25 is a sectional view of the second battery pack, shown being attached to the first battery pack.
Figure 26:
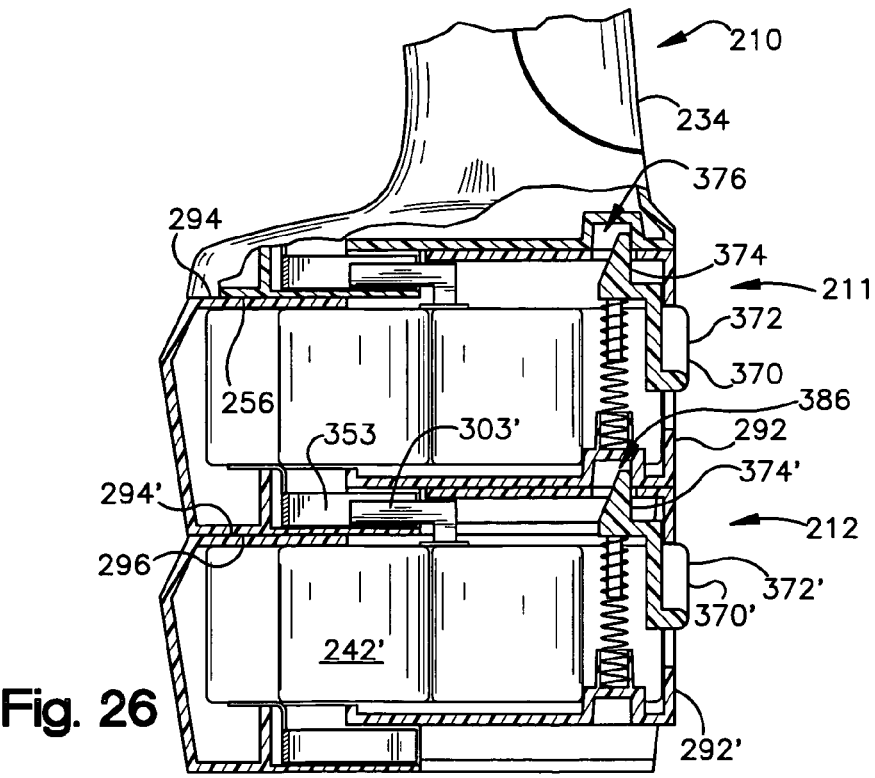
FIG. 26 is a view similar to FIG. 25, with the second battery pack fully attached to the first battery pack.

Next, the user does the following to boost motor speed. The user charges the second battery pack 212 as explained above with reference to the first battery pack 211. The user attaches the second pack 212 to first battery pack 211 like he attached the first battery pack 211 to the tool 210. Specifically, as indicated by an arrow 373' in FIG. 25, the user moves the second pack 212 forward, with the pack housing top wall 294' sliding up against the tool housing bottom wall 296. This continues until the wedge 374' of the latch 370' of the second pack 212 snaps into a recess 386 of the first pack 211 to lock the second pack 212 in place, as shown in FIG. 26. The second pack 212 is thus directly attached to the first pack 211, which is itself directly attached to the drill 210. Accordingly, the second pack 212 is attached to the tool 210 through the first pack 211.

Figure 27:
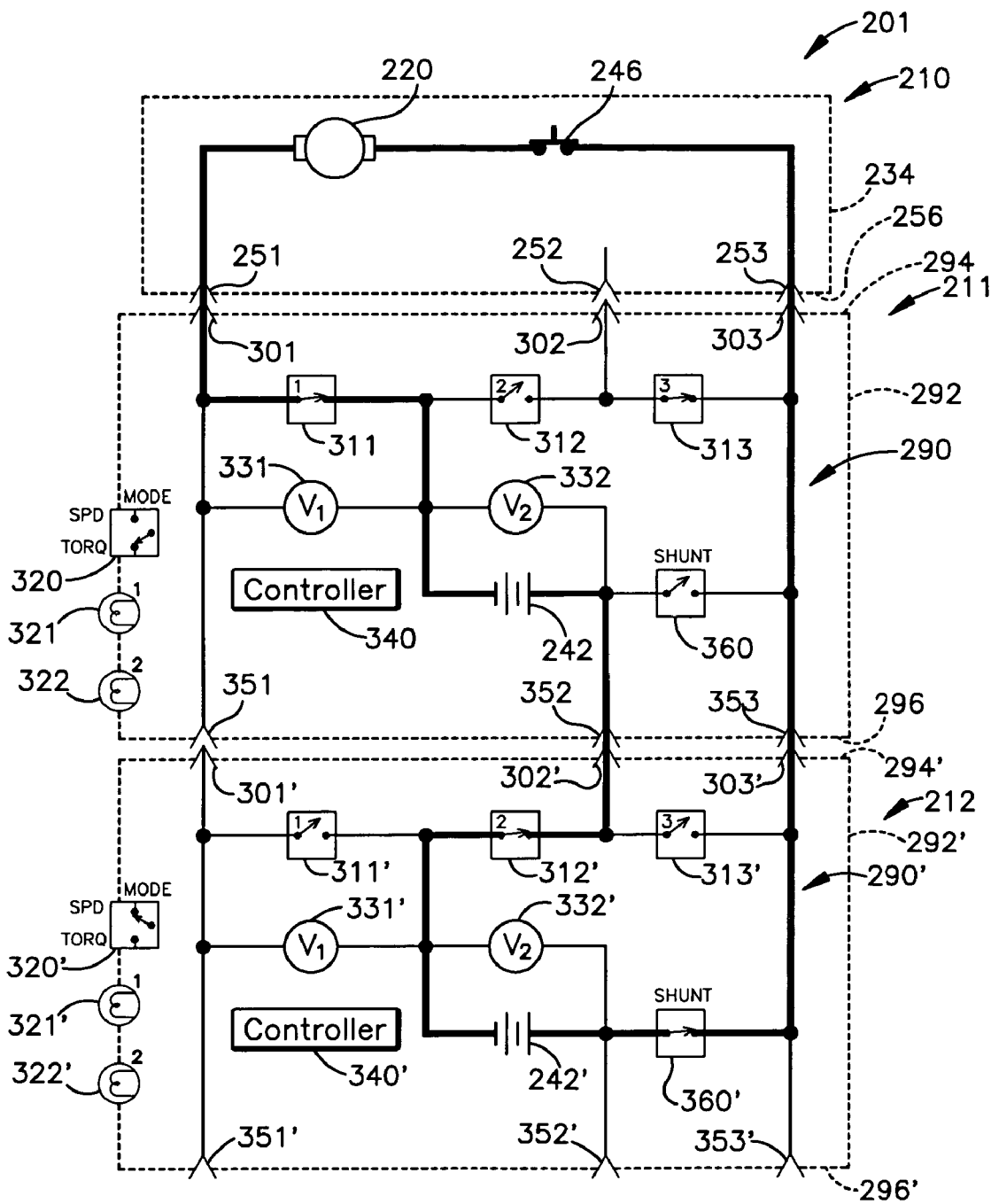
FIG. 27 is a circuit diagram of the second tool and the first and second battery packs attached together and used in a first mode of operation.

The resulting circuit is shown schematically in FIG. 27. As indicated above, reference numbers of the second pack 212 are primed to differentiate them from corresponding components of the first pack 211. Before depressing the trigger switch 46, the user sets the mode select switch 320' of the second pack 212 to "boost speed". In response, the controller 340' closes the second switch 312' in accordance with the control scheme. This connects the batteries 242 and 242' in series, as indicated by the thick line representing current path. Relative to using only one pack 211, this series configuration boosts the voltage applied across the motor 20 and thus boosts motor speed.

Figure 28:
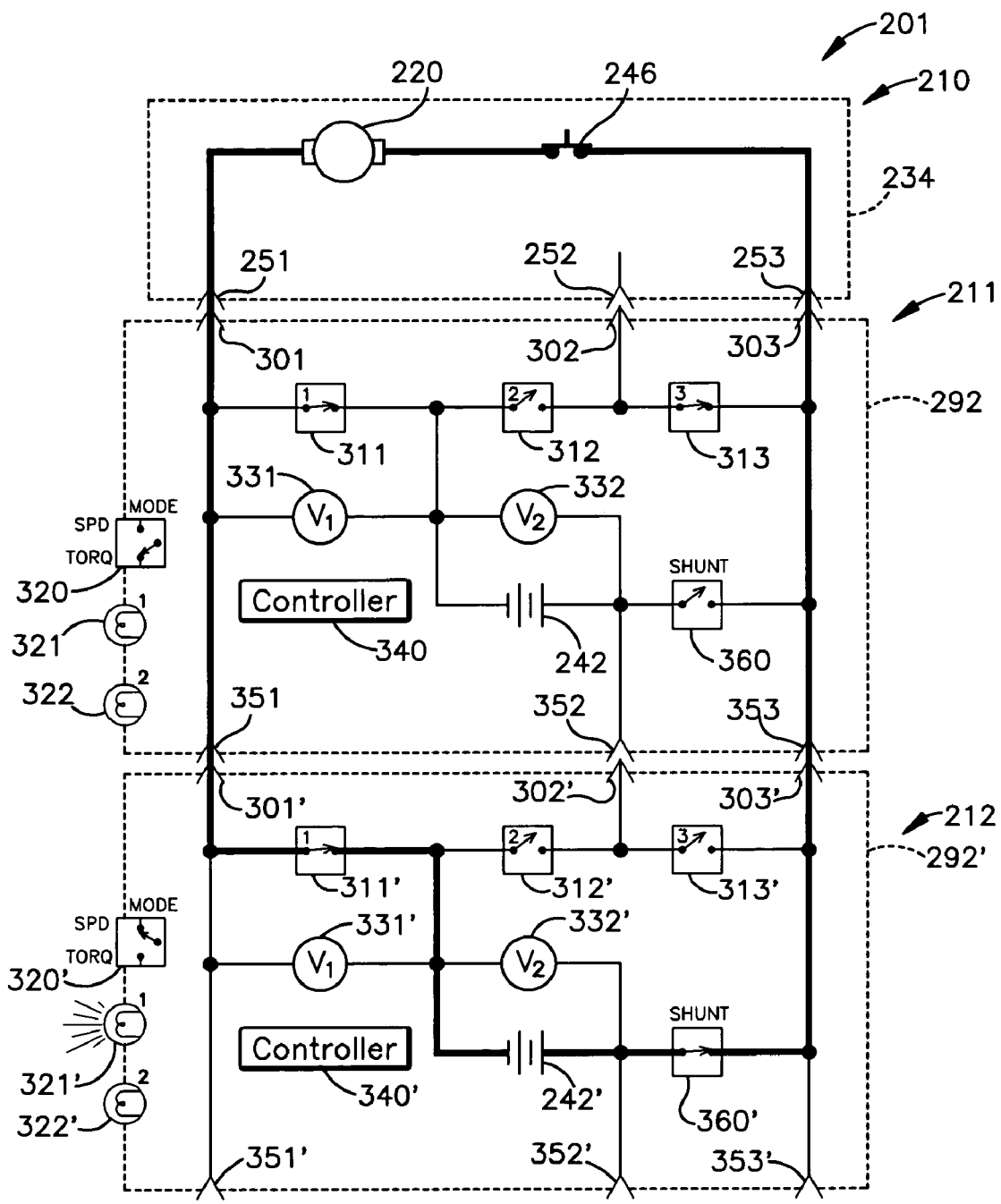
FIG. 28 is a circuit diagram of the second tool and the first and second battery packs attached together and used in a second mode of operation.

As the motor 220 runs, the controller 340' of the second pack 212 monitors the first and second battery voltages $V_1$ and $V_2$ individually. In this example, at some point, the first voltage $V_1$ drops below the first threshold voltage $V_{T1}$, indicating the battery 242 of the first pack 211 is weak. In response, the controller 340' opens the second switch 312 and closes the first switch 311 as shown in FIG. 28 in accordance with the control scheme. This diverts the current around the weak battery 242 of the first pack 211, thereby taking it off line, while continuing to power the motor 220 with the battery 242' of the second pack 212. The motor 220 continues running, but at a slower rate. The controller 140' lights the first lamp 321' of the second pack 212 to notify the user that the battery 242 of the first pack 211 is weak and has been taken off line.

Next, in this example, the user detaches the battery packs 211 and 212 and recharges them. He then re-attaches them to the tool 210 and depresses the trigger switch 246. The resulting path of current path is shown in FIG. 27 as explained above.

Figure 29:
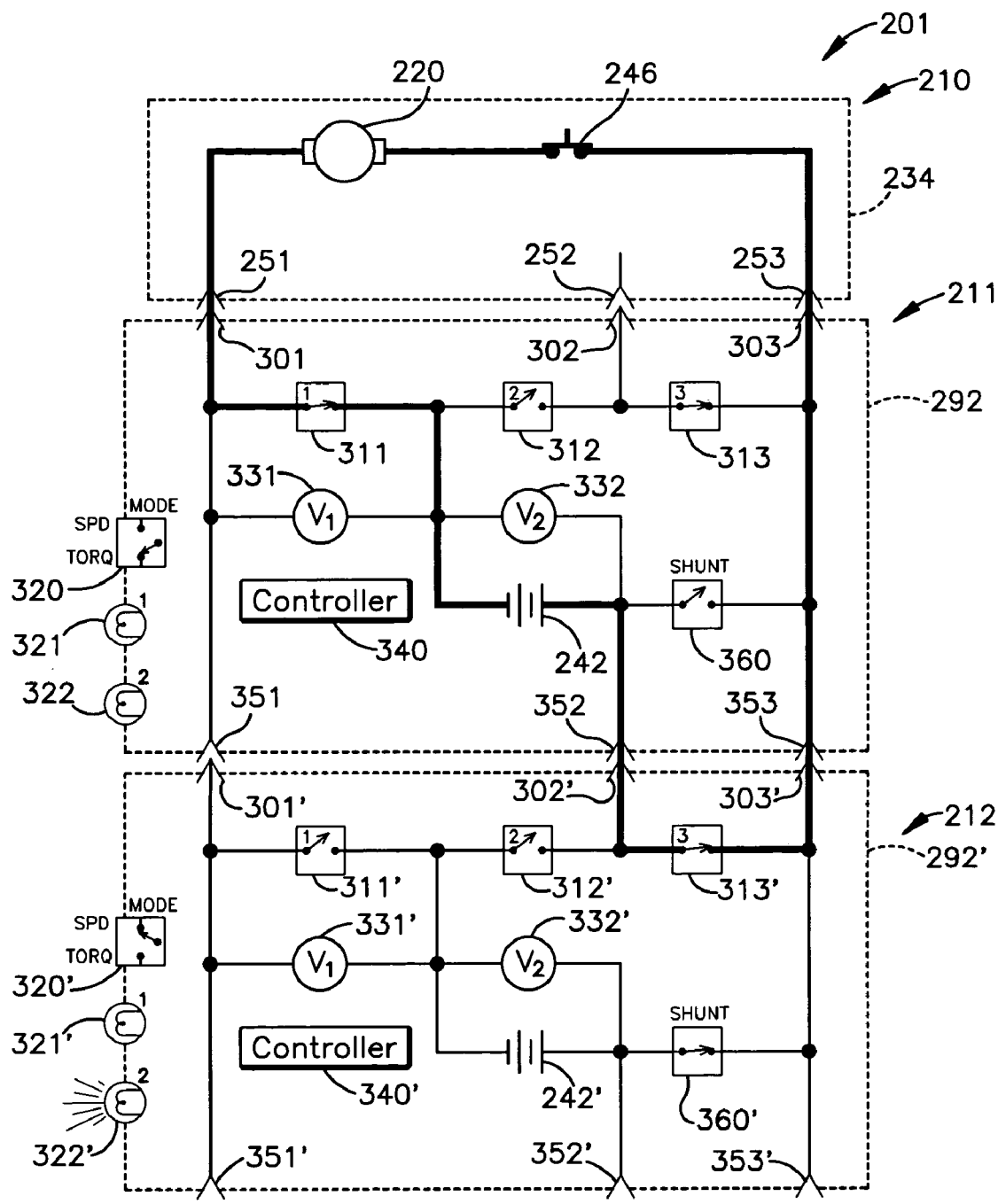
FIG. 29 is a circuit diagram of the second tool and the first and second battery packs attached together and used in a third mode of operation.

This time, as the motor 220 runs, the second voltage $V_2$ drops below the second threshold $V_{T2}$ due to the battery 242' of the second pack 212 becoming weak. In response, as shown in FIG. 29, the controller 340' of the second pack 212 opens the second switch 312' and closes the third switch 313' in accordance with the control scheme. This diverts the current around the weak battery 242' of the second pack 212 while continuing to power the motor 220 with the battery 242 of the first pack 211. The controller 340' of the second pack 212 lights the second lamp 322' to indicate that the battery 242' of the second pack 212 is weak and has been taken off line.

Figure 30:
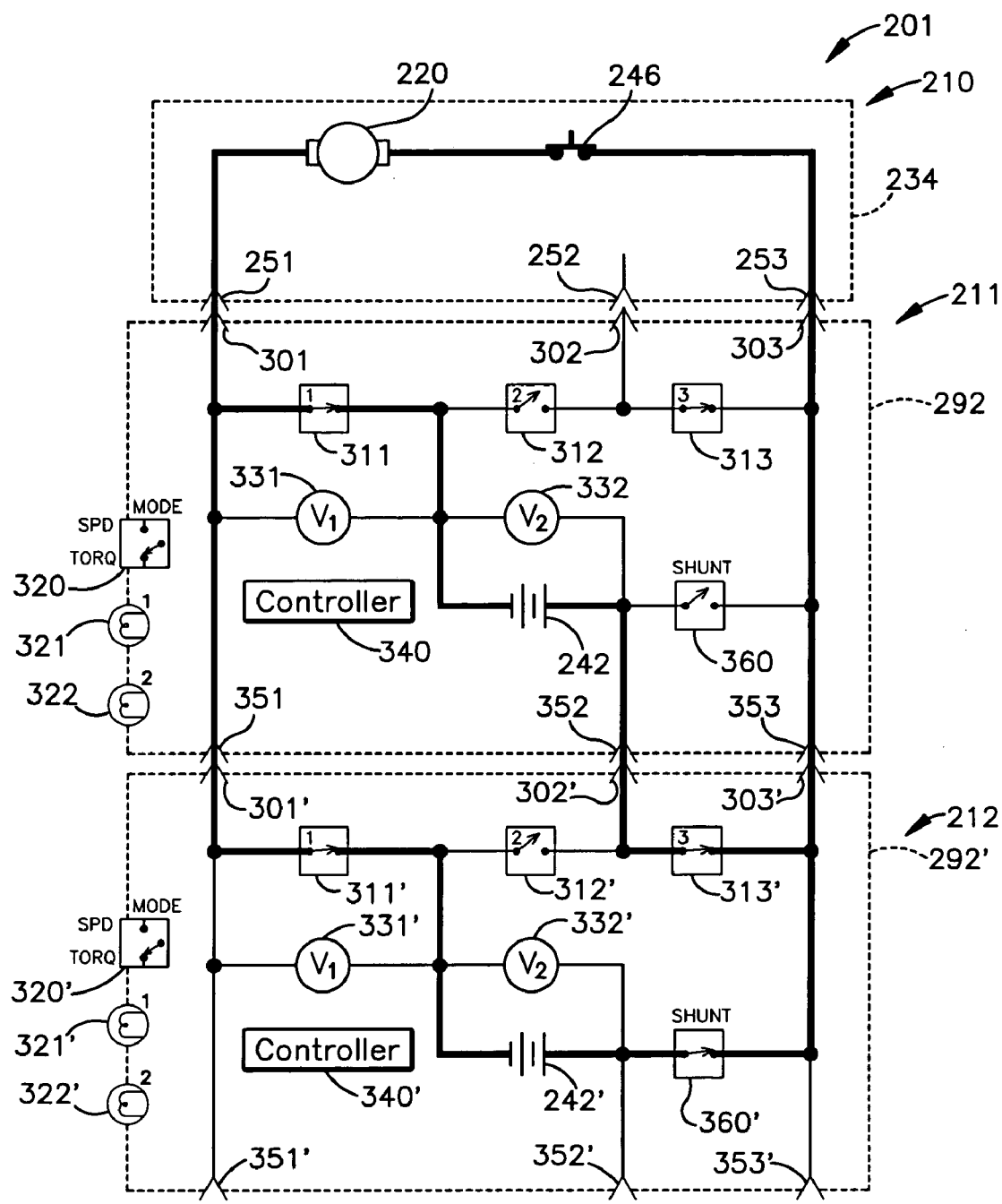
FIG. 30 is a circuit diagram of the second tool and the first and second battery packs attached together and used in a fourth mode of operation.

Next, the user detaches the packs 211 and 212, recharges them, and re-attaches them. This time, before squeezing the trigger 46, as shown in FIG. 30, he switches the mode switch 320 of the second pack 212 to "boost torque". In response, the controller 340 of the second pack 212 closes only the first and third switches 311 and 313 in accordance with the control scheme. This causes the current to flow through the batteries 242 and 242' in parallel. Relative to using only one battery, this parallel configuration increases the current available to the motor 220, which increases achievable torque and extends battery life.

Figure 31:
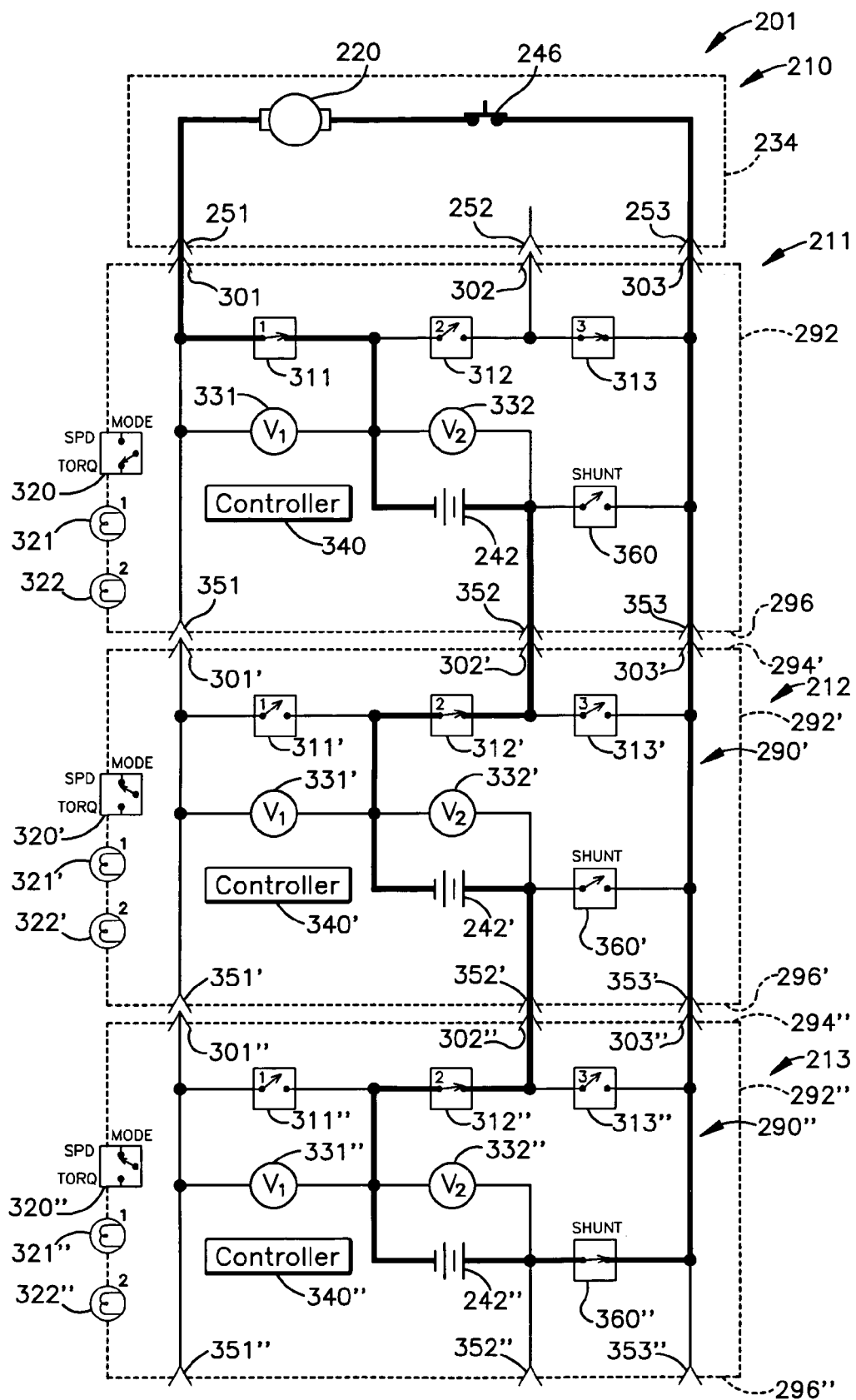
FIG. 31 is a circuit diagram of the second tool, the first and second battery packs and a third battery pack attached together and used in a fifth mode of operation.

Any number of additional battery packs can be added to the stack. For example, FIG. 31 schematically shows the circuitry with a third battery pack 213 attached to the bottom of the second battery pack 212. Components of the third battery 213 pack are double-primed to differentiate them from the components of the first two packs 211 and 212. The mode switch 320 of the first pack 211 is set on "boost torque". For all other packs 212 and 213 in the stack, the setting of each mode select switch 320' and 320" determines whether the corresponding battery 242' and 242" will be connected in series or in parallel with the battery 320 and 320' just above it in the stack.

In this example, the stack of battery packs 211, 212 and 213 is a linear. That is because, in this example, the battery packs 211, 212 and 213 all have output prongs 301, 302 and 303 located at the top wall 294 and the input jacks 251, 252 and 253 located at opposite, bottom, wall 296.

In FIG. 31, the mode switches 320' and 320" of the second and third battery packs 212 and 213 are set to "boost speed". In accordance with the control scheme, all three batteries 242, 242' and 242" are connected in series, as indicated by the thick line representing the current path. This nominally triples motor speed relative to using only one battery pack.

Figure 32:
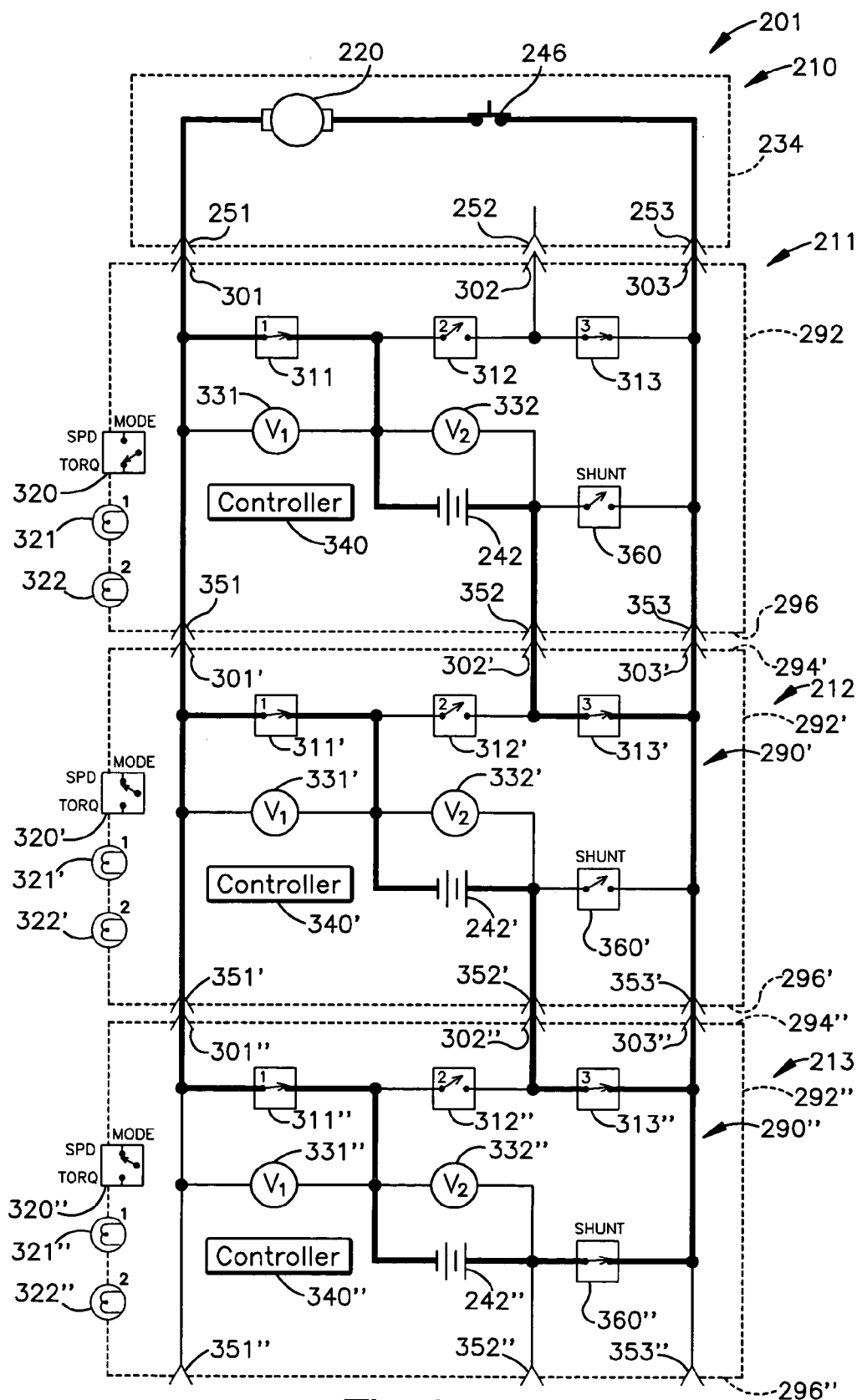
FIG. 32 is a circuit diagram of the second tool and the first, second and third battery packs, attached together and used in a sixth mode of operation.

In FIG. 32, the mode switches 320' and 320" of the second and third packs 212 and 213 are instead set to "boost torque". This causes the first and third switches 311 and 313 of each pack 211, 212 and 213 to be closed in accordance with the table above. That, in turn, causes the current indicated by the thick line to flow through all three batteries 242, 242' and 242" in parallel.

Third Apparatus

Figure 33:
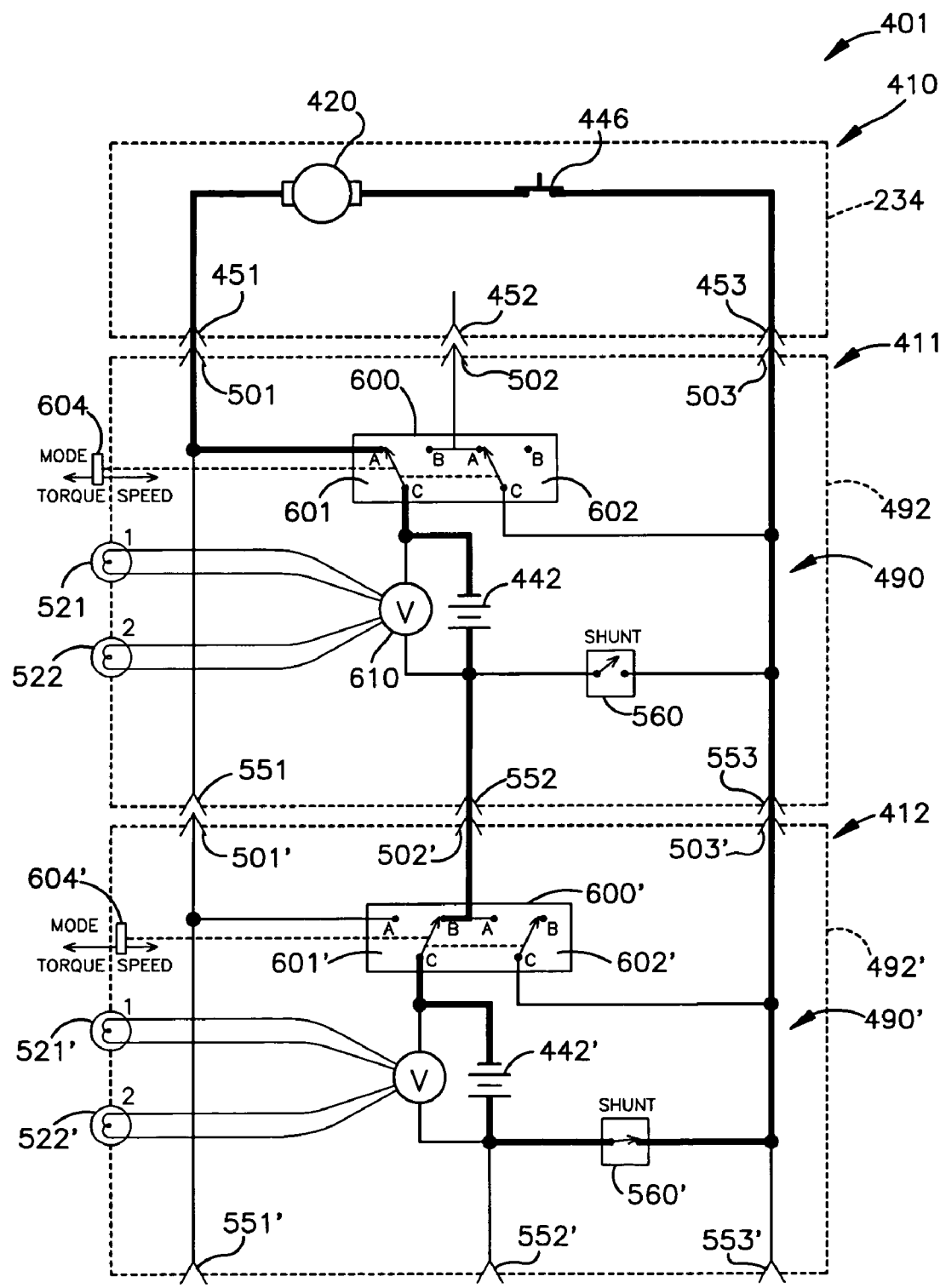
FIG. 33 is a circuit diagram of a third tool and two other battery packs attached together and used in a seventh mode of operation.

A third apparatus 401 is illustrated schematically in FIG. 33. It includes a tool 410 and first and second battery packs 411 and 412. Components of the second pack 412 are primed to differentiate them from components of the first pack 411.

The tool 410 is identical to the tool 210 of the second apparatus 201 (FIG. 27). It has a motor 420, a trigger switch 446 and three input terminal jacks 451, 452 and 453. As with the second apparatus 201, the tool 410 of this apparatus 201 can be powered solely by one battery pack 411 and, alternatively, by a stack of two or more battery packs 411 and 412.

The battery packs 411 and 412 in this example are alike, and differ from the battery packs 211 and 212 of the second apparatus 201 only in their circuits 490 and 490'. The packs 411 and 412 are described as follows with reference to the first battery pack 411.

Each battery pack 411 includes a housing 492, a battery 442, three output terminal prongs 501, 502 and 503, two lamps 521 and 522, three input terminal jacks 551, 552 and 553 and a shunt switch 560. These components are like the corresponding components of the second apparatus 201.

However, in contrast to the battery pack 211 of the first apparatus 201, this battery pack 411 has a double pole double throw switch 600 serving as a mode select switch. The switch 600 has a first and second sections 601 and 602, each with two contacts A and B and common C. The switch 600 has a lever 604 for selecting whether the commons C are connected to contacts A or to contacts B. The mode switch 600 enables the user to select between "boost speed", in which the battery 442 is in series with the battery above it, and "boost torque", in which the battery 442 is in parallel with the battery above it.

A voltage monitor 610 is connected across the battery 442 to monitor battery voltage V. The monitor 610 is also connected to the lamps 521 and 522. The monitor 610 continuously compares the battery voltage with a lower threshold and an upper threshold. The monitor 610 lights the first lamp 521 when the battery voltage is above the lower threshold and lights the second lamp 522 when the battery voltage is above the upper threshold.

The lower threshold can be a voltage below which the battery is considered sufficiently weak to warrant recharging before further use. Unlike the battery packs 40 and 211 described above, this battery pack 411 does not automatically divert current around the weak battery. Instead, when the user notices that the first lamp 521 is unlit, he stops using the tool and recharges the battery 442. Other lamps may be added to provide a more graduated indication of the battery strength both above and below the lower threshold.

The upper threshold can be a voltage above which the battery 442 is fully charged. When the battery 442 is being charged, lighting of the second lamp 522 indicates to the user that the battery is fully charged and may be removed from the charger.

The first output prong 501 is connected to the first input jack 551. The third output prong 503 is connected to the third output jack 553. The shunt 560 connects the second input jack 552 to the third input jack 553. Regarding the first switch section 601, contact A is connected to the first input jack 551, contact B is connected to the second output prong 502, and common C is connected by the battery 442 to the second input jack 552. Regarding the second switch section 602, contact A is connected to the second output prong 502, contact B is unconnected, and common C is connected to the third input jack 553.

In FIG. 33, the packs 411 and 412 are stacked, with the second pack 412 removably attached to the first pack 411, which is itself removably attached to the tool 410. The mode switch 521 of the pack directly attached to the tool 410 is set to "boost torque". In this example the mode switch 604' of the second pack 412 is set to "boost speed". This causes the batteries 442 and 442' to be connected in series, which boosts motor speed.

Figure 34:
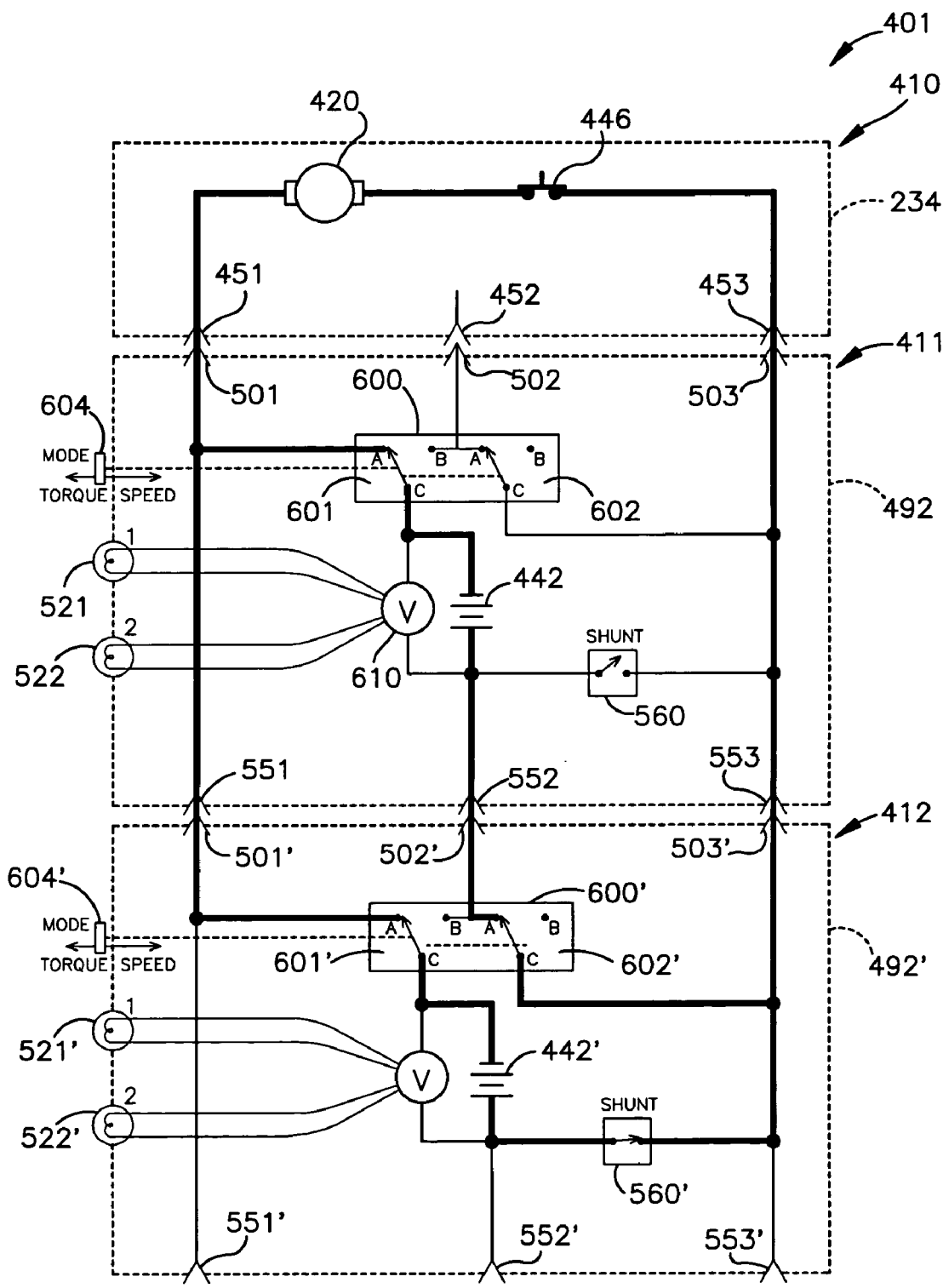
FIG. 34 is a circuit diagram of the third tool and the two other battery packs attached together and used in an eighth mode of operation.

In FIG. 34, the mode switch 604' of the second pack 412 is set to "boost torque". This causes the batteries 442 and 442' to be connected in parallel, which boosts torque.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A handheld tool comprising:
a load;
a primary battery;
input terminals configured to connect to output terminals of a battery pack that output electricity from an auxiliary battery in the pack; and
a circuit configured to power the load solely from the primary battery when the input terminals are not connected to battery pack output terminals and do not input electricity into the tool, and to switch, automatically and in response to the input terminals being connected to the auxiliary battery output terminals, to powering the load with both the primary and auxiliary batteries electrically in series;
wherein the input and output terminals comprise prongs and jacks, and removably attaching the pack to the tool entails plugging the prongs into the jacks, which immediately places the auxiliary battery in series with the primary battery and the load.

2. The tool of claim 1 further comprising a handheld tool housing, removably attachable to the battery pack, that houses the load, the primary battery and the circuit.

3. An apparatus comprising the tool of claim 1 and the battery pack, wherein, when the tool is removably attached to the pack, the tool and the pack are attached rigidly together to form a tool structure that can be grasped by hand as a single unit.

4. The tool of claim 1 wherein the tool is a drill.

5. The tool of claim 1 wherein the load is a motor.

6. The tool of claim 1 wherein the circuit is configured to monitor, while the tool is powered with both batteries in series, the voltages of the primary and auxiliary batteries individually to determine which, if any, of the two batteries is weak.

7. The tool of claim 6 wherein the circuit is configured to divert current around the weak battery while continuing to power the load through the other battery.

8. The tool of claim 6 wherein the circuit is configured to display an indication of which of the two batteries is weak.

9. The tool of claim 1 wherein the circuit can connect the auxiliary battery user-selectably in series or in parallel with the primary battery and the load when the pack output terminals are connected to the tool input terminals.

10. An apparatus comprising:
a tool having first and second input terminals for inputting electrical current with which to power the tool;
a self-contained first battery pack comprising a first battery, first and second input terminals and first and second output terminals, and configured to be removably attached to the tool with the output terminals of the first pack respectively connected to the tool input terminals to power the tool solely from the first battery by electrons flowing from the first pack into the tool through the first output terminal of the first pack and the first input terminal of the tool and returning into the first pack through the second input terminal of the tool and the second output terminal of the first pack; and
a self-contained second battery pack comprising a second battery and first and second output terminals, and configured to be removably attached to the first pack while the first pack is attached to the tool, with the output terminals of the second pack respectively connected to the input terminals of the first pack for electrons to flow from the second pack into the first pack through the first output terminal of the second pack and the first input terminal of the first pack and to return from the first pack into the second pack through the second input terminal of the first pack and the second output terminal of the second pack, and the output terminals of the first pack respectively connected to the tool input terminals to power the tool with both batteries in series, and the second pack sensing whether the first battery is weak.

11. The apparatus of claim 10 wherein the second pack is configured to sense, while the tool is being powered by both batteries in series, also whether the second battery is weak and to divert the current powering the tool around the weak battery while continuing to power the tool through the battery that is not weak.

12. A handheld tool comprising:
a load;
a primary battery;
input terminals configured to connect to output terminals of a battery pack that output electricity from an auxiliary battery in the pack; and
a circuit configured to power the load solely from the primary battery when the input terminals are not connected to battery pack output terminals and do not input electricity into the tool, and to switch, automatically and in response to the input terminals being connected to the auxiliary battery output terminals, to powering the load with both the primary and auxiliary batteries electrically in series;
wherein the circuit is configured to short the input terminals together when the input terminals are not connected to an external power source and to remove the short in response to the input terminals being electrically connected to the auxiliary battery output terminals.

13. The tool of claim 12 further comprising a handheld tool housing, removably attachable to the battery pack, that houses the load, the primary battery and the circuit.

14. An apparatus comprising the tool of claim 12 and the battery pack, wherein, when the tool is removably attached to the pack, the tool and the pack are attached rigidly together to form a tool structure that can be grasped by hand as a single unit.

15. The tool of claim 12 wherein the tool is a drill.

16. The tool of claim 12 wherein the load is a motor.

17. The tool of claim 12 wherein the circuit is configured to monitor, while the tool is powered with both batteries in series, the voltages of the primary and auxiliary batteries individually to determine which, if any, of the two batteries is weak.

18. The tool of claim 17 wherein the circuit is configured to divert current around the weak battery while continuing to power the load through the other battery.

19. The tool of claim 17 wherein the circuit is configured to display an indication of which of the two batteries is weak.

20. The tool of claim 12 wherein the circuit can connect the auxiliary battery user-selectably in series or in parallel with the primary battery and the load when the pack output terminals are connected to the tool input terminals.

* * * * *